(12) United States Patent
Ito et al.

(10) Patent No.: US 10,449,705 B2
(45) Date of Patent: Oct. 22, 2019

(54) TRANSFER FILM FOR IN-MOLD MOLDING, METHOD FOR PRODUCING IN-MOLD MOLDED PRODUCT, AND MOLDED PRODUCT

(71) Applicant: JNC CORPORATION, Tokyo (JP)

(72) Inventors: Kenya Ito, Chiba (JP); Koji Ohguma, Chiba (JP)

(73) Assignee: JNC CORPORATION, Tokyo (JP)

( * ) Notice: Subject to any disclaimer, the term of this patent is extended or adjusted under 35 U.S.C. 154(b) by 1018 days.

(21) Appl. No.: 14/652,790

(22) PCT Filed: Dec. 2, 2013

(86) PCT No.: PCT/JP2013/082400
§ 371 (c)(1),
(2) Date: Oct. 7, 2015

(87) PCT Pub. No.: WO2014/097876
PCT Pub. Date: Jun. 26, 2014

(65) Prior Publication Data
US 2016/0046052 A1 Feb. 18, 2016

(30) Foreign Application Priority Data

Dec. 19, 2012 (JP) ................................. 2012-277481

(51) Int. Cl.
| | | |
|---|---|---|
| *B29C 45/16* | (2006.01) | |
| *B32B 7/02* | (2019.01) | |
| *B32B 15/08* | (2006.01) | |
| *B29C 45/14* | (2006.01) | |
| *B32B 27/38* | (2006.01) | |
| *B32B 27/40* | (2006.01) | |
| *B32B 27/42* | (2006.01) | |
| *C09D 1/00* | (2006.01) | |
| *B32B 27/08* | (2006.01) | |
| *B32B 27/36* | (2006.01) | |
| *B32B 37/02* | (2006.01) | |
| *B29K 101/10* | (2006.01) | |
| *B32B 37/26* | (2006.01) | |

(52) U.S. Cl.
CPC .... *B29C 45/1679* (2013.01); *B29C 45/14016* (2013.01); *B29C 45/1418* (2013.01); *B29C 45/14827* (2013.01); *B32B 7/02* (2013.01); *B32B 15/08* (2013.01); *B32B 27/08* (2013.01); *B32B 27/36* (2013.01); *B32B 27/38* (2013.01); *B32B 27/40* (2013.01); *B32B 27/42* (2013.01); *B32B 37/02* (2013.01); *C09D 1/00* (2013.01); *B29K 2101/10* (2013.01); *B29K 2995/0005* (2013.01); *B32B 2037/268* (2013.01); *B32B 2255/10* (2013.01); *B32B 2255/28* (2013.01); *B32B 2262/103* (2013.01); *B32B 2307/202* (2013.01); *B32B 2307/306* (2013.01); *B32B 2307/412* (2013.01); *B32B 2307/558* (2013.01); *B32B 2307/714* (2013.01); *B32B 2307/734* (2013.01); *B32B 2307/748* (2013.01); *B32B 2310/0831* (2013.01); *B32B 2398/10* (2013.01); *B32B 2571/00* (2013.01)

(58) Field of Classification Search
None
See application file for complete search history.

(56) References Cited

U.S. PATENT DOCUMENTS

| | | | | |
|---|---|---|---|---|
| 6,228,486 | B1 * | 5/2001 | Kittel | ................. B41M 5/38207 427/152 |
| 9,375,867 | B2 * | 6/2016 | Ito | ............................. B32B 7/06 |
| 2003/0203101 | A1 | 10/2003 | Haubrich et al. | |
| 2005/0181204 | A1 | 8/2005 | Wang et al. | |
| 2007/0069148 | A1 | 3/2007 | Blanding et al. | |
| 2007/0069418 | A1 | 3/2007 | Liao et al. | |
| 2008/0020196 | A1 * | 1/2008 | Onishi | ..................... B41M 5/44 428/304.4 |
| 2010/0063222 | A1 * | 3/2010 | Oikawa | ................. C08F 283/12 525/474 |

(Continued)

FOREIGN PATENT DOCUMENTS

| | | |
|---|---|---|
| CN | 1328508 | 12/2001 |
| JP | 02-261614 | 10/1990 |

(Continued)

OTHER PUBLICATIONS

"Office Action of China Counterpart Application with partial English translation", dated May 17, 2016, p. 1-p. 8.
"Office Action of Japan Counterpart Application with partial English translation", dated Jun. 21, 2016, p. 1-p. 7.
"Office Action of Japan Counterpart Application" with partial English translation thereof, dated Oct. 4, 2016, p. 1-p. 9.
"Office Action of Taiwan Counterpart Application" with partial English translation thereof, dated Apr. 14, 2017, p. 1-p. 6.
"International Search Report (Form PCT/ISA/210)", dated Jan. 7, 2014, with English translation thereof, pp. 1-2.

(Continued)

*Primary Examiner* — Anish P Desai
(74) *Attorney, Agent, or Firm* — JCIPRNET

(57) ABSTRACT

The transfer film for in-mold molding of the invention has transfer layer 11 being a transfer layer to be transferred onto a transfer object in in-mold molding and cured by irradiation with an active energy ray after being transferred; and film-like base L0. Transfer layer 11 has topcoat layer L2 laminated on base L0 to be arranged on a surface of a molded product after in-mold molding; and conductor layer L4 laminated on a side opposite to a base L0 side of topcoat layer L2, and laminated on topcoat layer L2. Topcoat layer L2 is composed of a mixed composition containing an active energy ray-curable resin and a thermosetting resin, and conductor layer L4 is formed of at least one kind selected from the group of a flexible metal, carbon and conductive polymer.

9 Claims, 6 Drawing Sheets

(56) References Cited

U.S. PATENT DOCUMENTS

| | | | | |
|---|---|---|---|---|
| 2011/0236703 A1* | 9/2011 | McGee | ...................... | C08J 5/18 |
| | | | | 428/463 |
| 2013/0158153 A1* | 6/2013 | Park | ................... | B41M 5/38242 |
| | | | | 522/71 |
| 2014/0113115 A1* | 4/2014 | Ito | ............................ | B32B 7/06 |
| | | | | 428/201 |

FOREIGN PATENT DOCUMENTS

| JP | H10258443 | 9/1998 | | |
|---|---|---|---|---|
| JP | 3233595 | 11/2001 | | |
| JP | 2006035772 | 2/2006 | | |
| JP | 2007-290315 | 11/2007 | | |
| JP | 2008126469 | 6/2008 | | |
| JP | WO 2008072766 A1 * | 6/2008 | ............ | C08F 283/12 |
| JP | 2009-9860 | 1/2009 | | |
| JP | 2009-034846 | 2/2009 | | |
| JP | 2009-241406 | 10/2009 | | |
| JP | 4683392 | 5/2011 | | |
| JP | 2011-235634 | 11/2011 | | |
| JP | 2012206299 | 10/2012 | | |
| JP | 2012221694 | 11/2012 | | |
| JP | WO 2012176742 A1 * | 12/2012 | ............... | B32B 7/06 |
| WO | 2004039856 | 5/2004 | | |

OTHER PUBLICATIONS

"Office Action of Taiwan Counterpart Application," dated Jan. 11, 2018, with partial English translation thereof, pp. 1-6.

\* cited by examiner

TRANSFER FILM FOR IN-MOLD MOLDING, METHOD FOR PRODUCING IN-MOLD MOLDED PRODUCT, AND MOLDED PRODUCT

CROSS-REFERENCE TO RELATED APPLICATION

This application is a 371 application of the international PCT application serial no. PCT/JP2013/082400, filed on Dec. 2, 2013, which claims the priority benefit of Japan application no. 2012-277481, filed on Dec. 19, 2012. The entirety of each of the abovementioned patent applications is hereby incorporated by reference herein and made a part of this specification.

TECHNICAL FIELD

The present invention relates to a transfer film for in-mold molding. In particular, the invention relates to a transfer film for in-mold molding, in which the transfer film has excellent heat resistance, durability, moldability and electrical conductivity.

BACKGROUND ART

"In-mold molding" means a technology in which, upon performing injection molding of plastics, ceramics or the like, a design-bearing film is interposed inside a mold to transfer an image, a photograph or the like onto a surface of the plastics or the like inside the mold simultaneously with injection molding. "Transfer film for in-mold molding" means a printed film used for an in-mold molding technology to provide a body to be transferred (transfer object) with decoration or other functions by allowing peeling of a transfer layer from a base film to transfer the transfer layer onto to the object. The transfer film for in-mold molding has been widely used for the purpose of decoration and surface protection of a cellular phone terminal, a housing of a laptop computer, a digital camera or the like, other home appliances, a cosmetic container, and also automotive interior and exterior parts.

Simultaneous molding and decoration in which a film is set inside the mold of injection molding includes two techniques, namely in-mold transfer according to which no film remains (no remaining film) in a molded product, and in-mold lamination according which a film remains in the molded product.

Above all, the in-mold transfer does not need a step of preform or trimming that has been complicated in the in-mold lamination because a remaining film is peeled from the molded product after the transfer film is molded and transferred in the in-mold transfer. Therefore, automation and speed increase in decoration and molding steps can be achieved. Further, the in-mold transfer is the technique having a high effect on improvement in productivity and cost reduction to exhibit a strong point in a mass production product in which an economy of scale is required.

The transfer film for in-mold molding is generally composed of a base film, a release layer, a topcoat layer, a printing layer and an adhesive layer, and is peeled on an interface between the release layer and the topcoat layer after injection molding. Therefore, an outermost surface of the molded product is exposed as the topcoat layer, and in order to obtain the molded product having excellent durability, chemical resistance and moldability, a role of the topcoat layer becomes significantly important.

As a method for obtaining the molded product having excellent durability and chemical resistance, a layer formed of an active energy ray-curable resin has been so far used for the topcoat layer.

A method for producing the transfer film for in-mold molding includes a method of irradiating a film with an active energy ray during preparing the film to allow crosslinking and curing (pre-cure) of the active energy ray-curable resin. However, followability of the topcoat layer to the object to be transferred is poor and a crack is easily developed during molding the resin. In order to prevent the crack from being developed, a method has been widely adopted in which no active energy ray is irradiated during preparing the film, and the topcoat layer on the outermost surface is irradiated with the active energy ray to allow crosslinking and curing (after-cure) of the active energy ray-curable resin after the topcoat layer is transferred onto the object to be transferred. However, the method has had a problem as described below.

Upon producing the film, flowability or adhesiveness of the active energy ray-curable resin remains if only a thermally drying step is applied, and during production according to a roll-to-roll system, the method has had such a problem as transferring of the resin onto a guide roll or occurrence of blocking in a winding portion.

Moreover, upon injection of a molding resin or the like into the mold during injection molding, a phenomenon (gate flow) has occurred in several cases in which the topcoat layer, the printing layer or the like near a mold-injecting portion (gate portion) flows out by the resin to be injected.

Furthermore, depending on a mold shape, no followability to a deeply drawn portion has been obtained due to lack of durability of the topcoat layer, and the crack has been developed in several cases.

Moreover, when electrical conductivity is required for the transfer film for in-mold molding, for example, an indium tin oxide (ITO) layer is further laminated thereonto in several cases. However, depending on the mold shape, if in-mold molding is performed by placing inside the mold the transfer film for in-mold molding in which the film has an ITO layer, such a method also has had a problem of break of the ITO layer to cause loss of electrical conductivity.

CITATION LIST

Patent Literature

Patent literature No. 1: JP H2-261614 A
Patent literature No. 2: JP 3233595 B
Patent literature No. 3: JP 4683392 B

SUMMARY OF INVENTION

Technical Problem

An objective of the invention is to solve a problem of a conventional art as described above to provide a transfer film for in-mold molding, in which the film has excellent heat resistance, durability and moldability, and occurrence of gate flow is suppressed to allow maintenance of electrical conductivity.

Solution to Problem

The present inventors have diligently continued to conduct study in order to solve the problem described above, and as a result, the present inventors have found that an active energy ray-curable resin and a thermosetting resin are mixed in a topcoat layer and crosslinking by the thermosetting resin is applied thereto in a thermally drying step to cause formation of three-dimensional network structure inside the topcoat layer, and a transfer film having excellent solvent resistance, heat resistance, durability and blocking resistance can be obtained even before curing with an active energy ray.

Further, the present inventors have found that, when an anchor layer is provided as a heat-resistant layer, the thermosetting resin contained in the topcoat layer is also added to the anchor layer and cured to improve adhesion between the topcoat layer and the anchor layer.

Further, the present inventors have found that a molded product after the transfer layer is transferred is irradiated with the active energy ray to allow crosslinking and curing of the resin in the topcoat layer to form interpenetrating polymer network structure (IPN structure), and finally, the molded product having excellent heat resistance and durability is also obtained.

Furthermore, the present inventors have found that electrical conductivity can be maintained by laminating a conductor layer containing a specific material, regardless of stretching of the film, and thus have completed the invention.

A transfer film for in-mold molding as related to a first embodiment of the invention has, for example as shown in FIG. 1(*a*), transfer layer 11 being a transfer layer to be transferred onto a transfer object in in-mold molding and cured by irradiation with an active energy ray after being transferred; and film-like base L0; in which transfer layer 11 has topcoat layer L2 laminated on base L0 to be arranged on a surface of a molded product after in-mold molding; and conductor layer L4 laminated on a side opposite to a side of base L0 of topcoat layer L2, and laminated on topcoat layer L2; and topcoat layer L2 is composed of a mixed composition containing an active energy ray-curable resin and a thermosetting resin, and conductor layer L4 is formed of at least one kind selected from the group of a flexible metal, carbon and conductive polymer.

In addition, "topcoat layer" means a layer to be arranged on the surface of the molded product after in-mold molding. An expression "laminated on (xxx layer)" includes a case of being directly laminated on the xxx layer without limitation and a case of being indirectly laminated thereon. "Layer to be directly laminated without interposing another layer therebetween" is described as "being directly laminated on the (xxx layer)." For example, "layer to be laminated on the topcoat layer" includes the layer to be directly laminated on the topcoat layer without limitation, and also the layer to be indirectly laminated (laminated through any other layer) thereon. The topcoat layer is a layer to be arranged typically on an outermost surface, but not limited thereto, and another protective layer, for example may be further arranged on a side of the surface of the topcoat layer.

If such structure is formed, the topcoat layer contains the active energy ray-curable resin and the thermosetting resin, respectively. Therefore, if the layer is heated by drying or the like in a film production process, the thermosetting resin contained in the topcoat layer is set, and the topcoat layer can have solvent resistance, heat resistance, durability, and blocking resistance even before the active energy ray-curable resin is cured, and moldability of the film is improved.

Further, the film has the conductor layer formed of at least one kind selected from the group of the flexible metal, carbon and conductive polymer, and therefore followability to the mold in-mold molding is improved, and the conductor layer can maintain electrical conductivity.

With regard to a transfer film for in-mold molding as related to a second embodiment, in the transfer film for in-mold molding as related to the first embodiment of the invention, for example as shown in FIG. 1(*a*), transfer layer 11 is a layer in which the thermosetting resin contained in topcoat layer L2 is set before being transferred.

If such structure is formed, the topcoat layer contains a set thermosetting resin. As a result, in in-mold molding, the topcoat layer can be adjusted to hardness at a degree at which no gate flow occurs during injection molding. On the other hand, irradiation with the active energy ray is performed after the transfer layer is transferred, and therefore the topcoat layer has elongation (softness) such that the layer follows the mold during injection molding. Thus, the hardness of the topcoat layer can be adjusted by shifting timing of curing the active energy ray-curable resin and the thermosetting resin in the topcoat layer. More specifically, the thermosetting resin is set during laminating the topcoat layer to provide the topcoat layer with a certain degree of hardness or heat resistance. Thus, the gate flow of the topcoat layer during injection molding is avoided. On the other hand, the topcoat layer contains the active energy ray-curable resin before being cured, and therefore development of the crack during injection molding can be suppressed. After in-mold molding, the active energy ray-curable resin is cured by irradiation with the active energy ray, and the hardness of the topcoat layer is further improved.

With regard to a transfer film for in-mold molding as related to a third embodiment of the invention, in the transfer film for in-mold molding as related to the first embodiment or the second embodiment of the invention, the thermosetting resin contains at least one kind of an epoxy resin, a melamine resin and a urethane resin.

If such structure is formed, heat resistance, adhesion, processability or the like of the topcoat layer can be further improved.

The epoxy resin has excellent heat resistance, adhesiveness and chemical resistance, the melamine resin has excellent heat resistance, hardness and transparency, and the urethane resin has excellent adhesiveness and low-temperature curability, and such resins can be appropriately selected and used.

With regard to a transfer film for in-mold molding as related to a fourth embodiment of the invention, in the transfer film for in-mold molding as related to any one of the first embodiment to the third embodiment of the invention, for example as shown in FIG. 1, the topcoat layer contains a surface modification component (FIG. 1(*a*)), or has surface modification layer L2*a* (FIG. 1(*b*)) on a plane serving as the surface of the molded product.

If such structure is formed, the topcoat layer contains the surface modification component or has the surface modification layer on a side of the plane serving as the surface of the topcoat layer. Therefore, durability or the like of the topcoat layer itself can be further improved. In addition, based on a surface modification function to be desirably provided for the topcoat layer, the surface modification component or a compound that composes the surface modification layer may be appropriately selected.

With regard to a transfer film for in-mold molding as related to a fifth embodiment of the invention, in the transfer film for in-mold molding as related to the fourth embodiment of the invention, the surface modification component or the surface modification layer contains at least one kind selected from a silicone compound, a fluorine compound and a fluorosilsesquioxane-containing compound.

If such structure is formed, an antifouling function can be provided for the topcoat layer or can be improved by a water-repellent and oil-repellent effect of the silicone compound, the fluorine compound and the fluorosilsesquioxane-containing compound.

With regard to a transfer film for in-mold molding as related to a sixth embodiment of the invention, in the transfer film for in-mold molding as related to any one of the first embodiment to the fifth embodiment, for example as shown in FIG. 1(a), transfer layer 11 has anchor layer L3 anchor layer that is between topcoat layer L2 and conductor layer L4, and directly laminated on the topcoat layer, and contains a set thermosetting resin to improve adhesion between topcoat layer L2 and any other layer; and the thermosetting resin contained in topcoat layer L2 and anchor layer L3 is of an identical kind in at least one kind.

If such structure is formed, the transfer film for in-mold molding has the anchor layer containing the set thermosetting resin. The anchor layer has heat resistance and can suppress occurrence of the gate flow during injection molding in in-mold molding. Moreover, when the film has the anchor layer, adhesion between the topcoat layer and the anchor layer can be improved when the layer is further laminated on the topcoat layer. In particular, when the anchor layer and the topcoat layer contain the identical thermosetting resin, respectively, the adhesion between the topcoat layer and the anchor layer can be improved.

With regard to a transfer film for in-mold molding as related to a seventh embodiment of the invention, in the transfer film for in-mold molding as related to any one of the first embodiment to the sixth embodiment of the invention, for example as shown in FIG. 1(a), transfer layer 11 has further printing layer L5 laminated on anchor layer L3 or conductor layer L4.

If such structure is formed, the transfer layer in in-mold molding has the printing layer. Therefore, various designs or the like can be applied to the resin to be subjected to injection-molding by using the printing layer.

With regard to a transfer film for in-mold molding as related to an eighth embodiment of the invention, in the transfer film for in-mold molding as related to any one embodiment of the first embodiment to the seventh embodiment of the invention, for example as shown in FIG. 1(a), transfer layer 11 further has adhesive layer L6 to be adhered with the resin for in-mold molding to be subjected to injection molding during the in-mold molding.

If such structure is formed, the transfer layer in in-mold molding has the adhesive layer. Therefore, adhesion between the transfer layer and the resin to be subjected to injection molding can be improved by the adhesive layer.

With regard to a method for producing an in-mold molded product as related to a ninth embodiment of the invention, for example as shown in FIG. 3, the method includes a step of placing and arranging on a mold the transfer film for in-mold molding as related to any one of the first embodiment to the eighth embodiment of the invention such that the side of base L0 is arranged on a side of the mold; and a step of injecting the resin for in-mold molding into the transfer film for in-mold molding.

If such structure is formed, the topcoat layer contains the active energy ray-curable resin and the thermosetting resin. Therefore, hardness and heat resistance of the topcoat layer can be improved by setting the thermosetting resin prior to the step of arrangement and the step of injection, and the gate flow occurred upon the step of injection can be suppressed. When the film further has the anchor layer, the anchor layer also contains the thermosetting resin. Therefore, the anchor layer also has heat resistance, and the gate flow occurred upon the step of injection can be suppressed.

Further, upon the step of placing and arranging on the mold the transfer film for in-mold molding, the conductor layer follows the mold, and the conductor layer does not lose electrical conductivity.

A molded product related to a tenth embodiment of the invention has transfer layer 11 of the transfer film for in-mold molding as related to any one of the first embodiment to the eighth embodiment of the invention; and the transfer object onto which transfer layer 11 is transferred.

If such structure is formed, the molded product can have heat resistance, durability, moldability and electrical conductivity.

Advantageous Effects of Invention

A transfer film for in-mold molding of the invention has excellent heat resistance, durability and moldability, and occurrence of gate flow can be suppressed because a topcoat layer contains an active energy ray-curable resin and a thermosetting resin. Further, electrical conductivity can be maintained, by a conductor layer that easily follows a shape of a mold, even after in-mold molding.

BRIEF DESCRIPTION OF DRAWINGS

FIG. 1 is a diagram showing layer structure of a transfer film for in-mold molding, in which FIG. 1(a) shows a case where topcoat layer L2 contains or does not contain a surface modification component, and FIG. 1(b) shows a case where topcoat layer L2' has surface modification layer L2a.

DESCRIPTION OF EMBODIMENTS

The invention is based on the application for patent No. 2012-277481 filed on Dec. 19, 2012 in Japan, and the content forms part thereof as the content of the Invention. The invention will be more completely understood by the detailed description below. A further range of application of the invention will become apparent from the detailed description below. However, it should be understood that the detailed description and a specific example indicate desirable embodiments of the invention, and are provided for the purpose of illustration only because it will be apparent to those skilled in the art that various modifications and variations can be made without departing from the spirit or scope of the invention from the detailed description. An applicant has no intention to present any of the described embodiments to the public, and among modifications and variations, the subject matter that may not be fallen within the scope of claims should also be part of the invention under the doctrine of equivalents.

An embodiment of the invention is described below with reference to a drawing. In addition, an identical or similar symbol is attached to an identical part or corresponding part with each other in each drawing, and an overlapped description is omitted. Moreover, the invention is in no way limited to the embodiment below.

Transfer Film for in-Mold Molding

Figure 1:
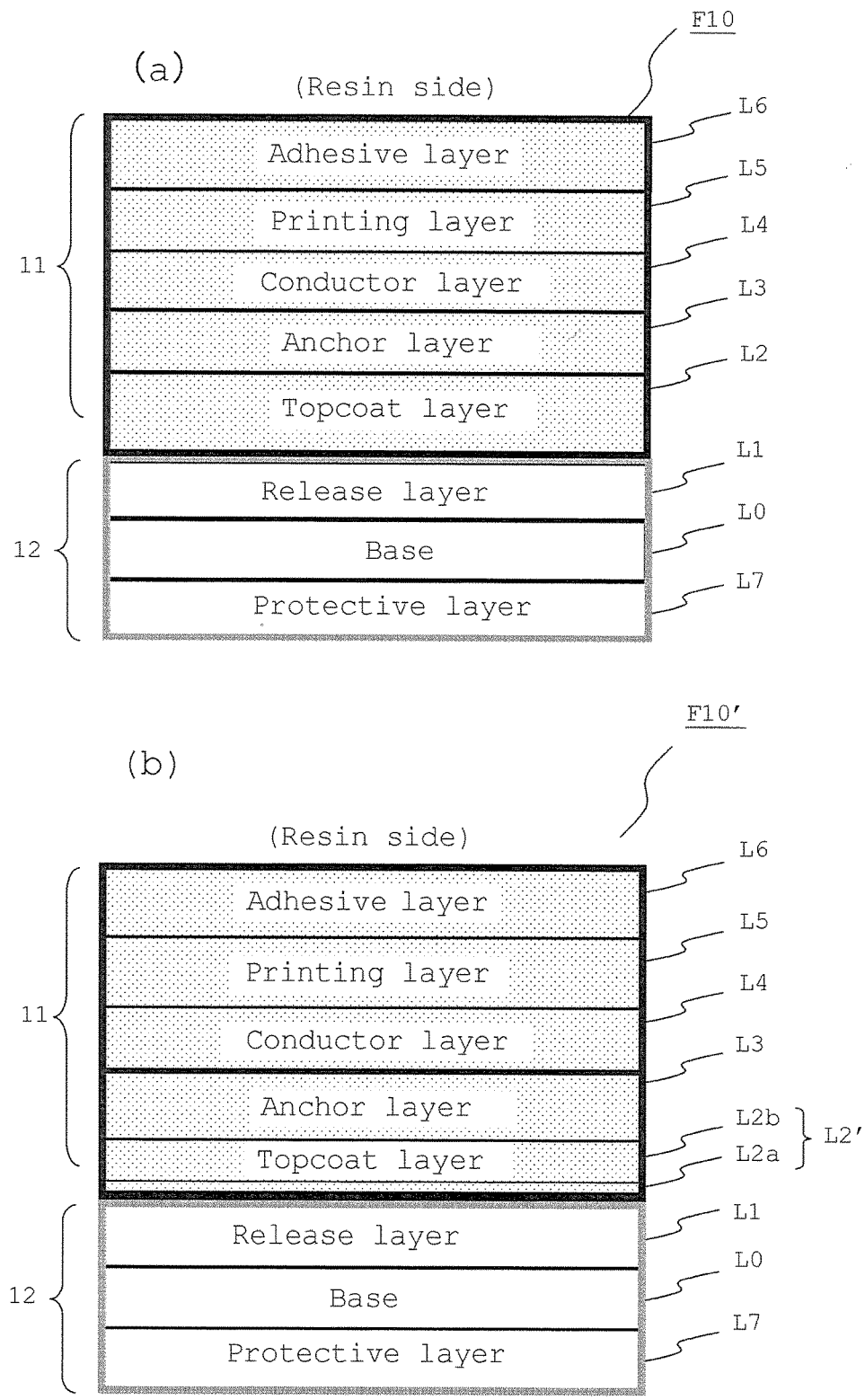

Transfer film F10 for in-mold molding (simply referred to as transfer film in several cases) as related to a first embodiment of the invention is described with reference to FIG. 1(a). In addition, FIG. 1(a) illustrates layer structure of transfer film F10 for in-mold molding composed in a multilayer, and a thickness of each layer is exaggerated. Transfer film F10 for in-mold molding has film-like base L0 as a base, release layer L1, topcoat layer L2, anchor layer L3, conductor layer L4, and also printing layer L5 and adhesive layer L6.

Figure 3:
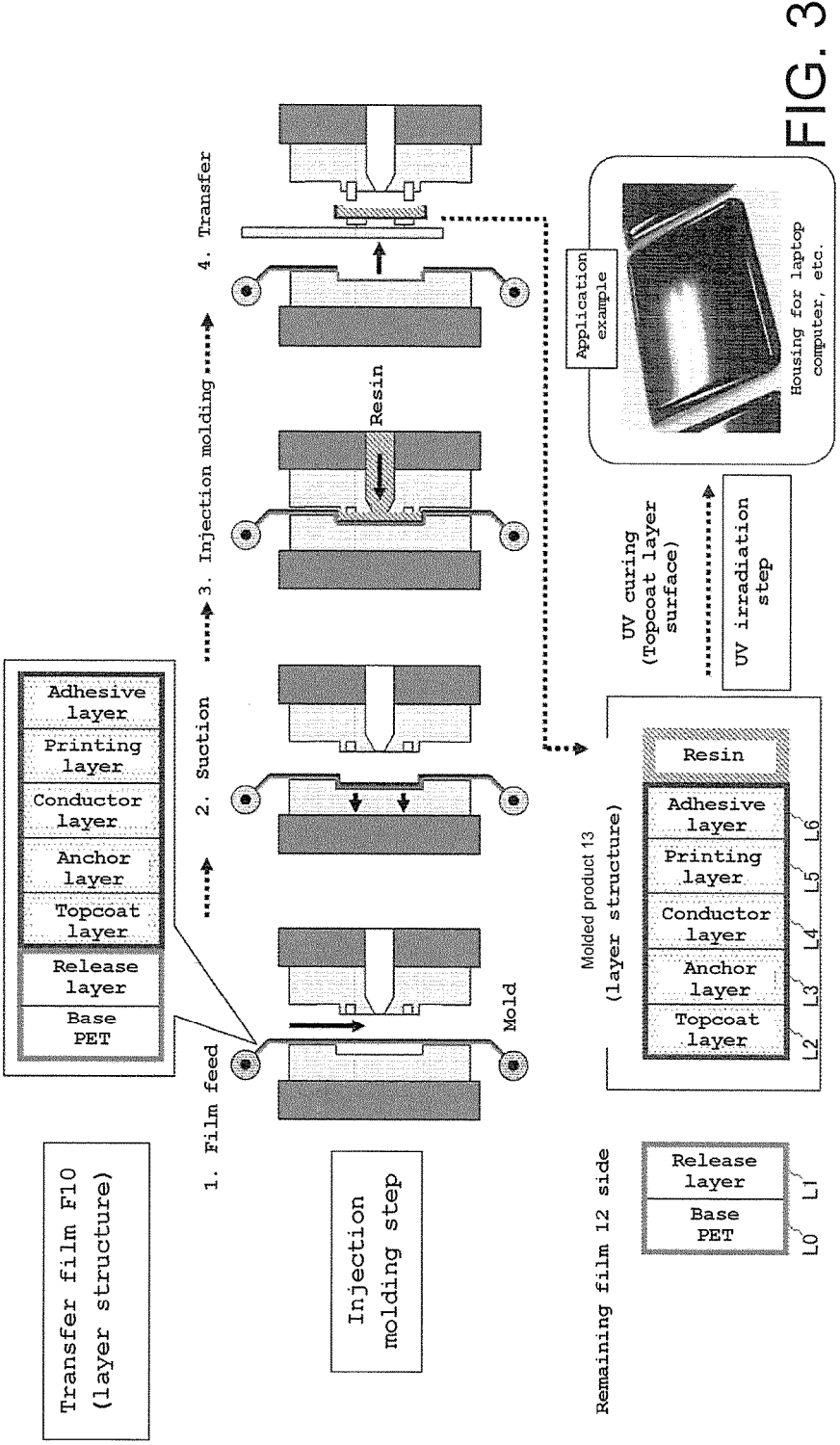
FIG. 3 is a diagram showing an example of use of a transfer film for in-mold molding.

In in-mold molding, a resin or the like is subjected to injection molding on a side of one surface of adhesive layer L6 (in FIG. 1(a), an upper side of adhesive layer L6, or a side opposite to the printing layer relative to adhesive layer L6). As shown in FIG. 3, after injection molding of the resin or the like, transfer film F10 for in-mold molding is separated on a boundary surface between release layer L1 and topcoat layer L2. Transfer layer 11 (topcoat layer L2/anchor layer L3/conductor layer L4/printing layer L5/adhesive layer L6) is transferred onto the resin, and remaining film 12 (base L0/release layer L1) is separated and remains.

Base L0

Base L0 functions as a support during production of transfer film F10 for in-mold molding. Various kinds of plastics films can be used for base L0 as a film-like polymer resin. Specific examples of materials for plastics films include a resin such as a polyester resin, an acetate resin, a polyethersulfone resin, a polycarbonate resin, a polyamide resin, a polyimide resin, a polyolefin resin, a (meth)acrylic resin, a polyvinyl chloride resin, a polyvinylidene chloride resin, a polystyrene resin, a polyvinylalcohol resin, a polyarylate resin, a polyphenylenesulfide resin and a cyclic polyolefin resin. Specifically, polyethylene terephthalate (PET), polyethylene naphthalate, triacetyl cellulose, polyether sulphone, polycarbonate, polyarylate, polyether ether ketone or the like is preferred. In addition, polyethylene terephthalate (PET) and polyethylene naphthalate have excellence mechanical strength, dimensional stability, heat resistance, chemical resistance, optical characteristics or the like, and smoothness on a film surface and handling ability, and therefore are further preferred. Polycarbonate has excellence transparency, impact resistance, heat resistance, dimensional stability and flammability, and therefore are further preferred. If a price and ease of availability are taken into consideration, polyethylene terephthalate (PET) is particularly preferred.

A film thickness of base L0 is preferably 10 to 100 micrometers, and further preferably 25 to 50 micrometers. If the film thickness of base L0 is 10 micrometers or more, the mechanical strength of the base can be maintained, and each layer of transfer film F10 for in-mold molding is easily formed. Moreover, if the film thickness is 100 micrometers or less, flexibility of transfer film F10 for in-mold molding can be kept, and is suitable for in-mold molding (particularly followability to a mold).

Release Layer L1

Release layer L1 is a layer to facilitate peel of transfer layer 11 (topcoat layer L2 and so forth) from base L0. In addition, when base L0 has release performance, release layer L1 can be omitted. Specific examples of materials of release layer L1 include a melamine resin, a polyolefin resin, an epoxy resin, an aminoalkyd resin, a silicone resin, a fluorocarbon resin, an acrylic resin, a paraffin resin, a urea resin and a fiber-based resin. When peel stability from transfer layer 11 and migration to transfer layer 11 are taken into consideration, a melamine resin such as a methylated melamine resin, a butylated melamine resin, a methyl-etherified melamine resin, a butyl-etherified melamine resin and a methylbutyl mixed-etherified melamine resin, and a polyolefin resin such as polyethylene and polypropylene are further preferred.

A film thickness of release layer L1 is preferably 0.01 to 5 micrometers, and further preferably 0.5 to 3 micrometers. If the film thickness of release layer L1 is 0.01 micrometer or more, stable release performance can be provided for base L0. In addition, if the film thickness is 5 micrometers or less, migration to topcoat layer L2 or remaining of topcoat layer L2 in release layer L1 can be prevented.

Release layer L1 can be laminated on base L0 by applying an application liquid containing as a main component the resin, and heating, drying and curing the resulting coated film.

The application liquid is obtained by mixing the resin, and when necessary, various kinds of additives and a solvent. A concentration of a resin component in the application liquid can be suitably selected, for example, by adjusting the liquid to viscosity according to a lamination method such as a wet coating method. The concentration is, for example, preferably 5 to 80% by weight, further preferably in the range of 10 to 60% by weight. As the solvent, for example, methyl isobutyl ketone, methyl ethyl ketone, butyl acetate, ethyl acetate, toluene, xylene, butanol, ethylene glycol monoethyl ether acetate or the like can be used.

In addition, a curable resin is used as the application liquid, and therefore is preferably in a liquid form before being cured.

The wet coating method according to which the application liquid is uniformly is coated is preferably used for lamination. As the wet coating method, a gravure coating method, a die coating method or the like can be applied. The gravure coating method is a system according to which a gravure roll a surface onto which uneven engraving is applied is dipped into the application liquid to scratch the application liquid attached onto an uneven portion on the surface of the gravure roll by a doctor blade to accumulate the liquid into a concave portion, thereby accurately measuring the amount and transferring the liquid into the base. The liquid having low viscosity can be thinly coated by the gravure coating method. The die coating method is a system according to which the liquid is coated while the liquid is pressurized and extruded from a head for application as called the die. Coating with high accuracy can be made by the die coating method. Further, the liquid is not exposed to open air during application, and therefore a change of a concentration of the applied liquid by dryness or the like is hard to occur. Specific examples of other wet coating methods include a spin coating method, a bar coating method, a reverse coating method, a roll coating method, a slit coating method, a dipping method, a spray coating method, a kiss coating method, a reverse kiss coating method, an air knife coating method, a curtain coating method and a rod coating method. For lamination, the method can be appropriately selected from the methods according to the film thickness required.

Further, lamination can be performed at a line speed of several tens of meters per minute (about 20 m/min, for example) by applying the wet coating method, and therefore the film can be produced in a large amount and production efficiency can be improved.

When the thermosetting resin is set, heating is satisfactorily performed, for example ordinarily at a heating temperature of 80 to 160° C., preferably at a heating temperature of 120 to 150° C. On the occasion, when an oven is used, the film is satisfactorily heated for 10 to 120 seconds.

Topcoat Layer L2

Topcoat layer L2 is a layer arranged on the surface of the molded product after in-mold molding, and functions as a surface protective layer. Topcoat layer L2 is composed by containing the active energy ray-curable resin and the thermosetting resin, respectively. In addition, another protective layer (not shown) may be provided on a side of release layer L1 of topcoat layer L2. Topcoat layer L2 can be protected by another protective layer.

"Active energy ray" herein means an energy ray that can decompose a compound generating active species to generate the activated species. Specific examples of such an active energy ray include a light energy ray such as visible light, ultraviolet light, infrared light, X-rays, α rays, β rays, γ rays and electron beams.

Specific preferred examples of the active energy ray-curable resin include a resin having an unsaturated bond that is radically polymerizable, such as a (meth)acrylate monomer, an unsaturated polyester resin, a polyester (meth)acrylate resin, an epoxy(meth)acrylate resin and a urethane (meth)acrylate resin. The resins may be used alone or in combination of a plurality of resins.

Specific examples of the (meth)acrylate monomer include a compound obtained by allowing α,β-unsaturated carboxylic acid to react polyhydric alcohol. Specific examples include polyalkylene glycol di(meth)acrylate, ethylene glycol(meth)acrylate, propylene glycol(meth)acrylate, polyethylene polytrimethylolpropane di(meth)acrylate, trimethylolpropane tri(meth)acrylate, trimethylolpropane ethoxy tri(meth)acrylate, trimethylolpropane diethoxy tri(meth)acrylate, trimethylolpropane triethoxy tri(meth)acrylate, trimethylolpropane tetraethoxy tri(meth)acrylate, trimethylolpropane pentaethoxy tri(meth)acrylate, tetramethylolmethane tetra(meth)acrylate, tetramethylolpropane tetra(meth)acrylate, pentaerythritol tri(meth)acrylate, pentaerythritol tetra(meth)acrylate, pentaerythritol penta(meth)acrylate, dipentaerythritol penta(meth)acrylate, dipentaerythritol hexa(meth)acrylate and (meth)acrylate having cyclic structure. Specific examples of (meth)acrylate having cyclic structure include a photopolymerizable monomer such as dicyclopentanyl(meth)acrylate, dicyclopentenyl (meth)acrylate, dicyclopentenyloxyethyl(meth)acrylate, isobornyl(meth)acrylate, tricyclodecanedimethanol di(meth)acrylate, mono-(meth)acrylate and di-(meth)acrylate having a terpene skeleton, and (meth)acrylate modified with ethylene glycol or propylene glycol of each.

Specific examples of the unsaturated polyester resin include a product obtained by dissolving into a polymerizable monomer a condensation product (unsaturated polyester) by an esterification reaction between polyhydric alcohol and unsaturated polybasic acid (saturated polybasic acid, when necessary).

The unsaturated polyester can be produced by allowing polycondensation of unsaturated acid such as maleic anhydride with diol such as ethylene glycol. Specific examples include a product obtained by using as an acid component polybasic acid having a polymerizable unsaturated bond, such as fumaric acid, maleic acid and itaconic acid, or anhydride thereof, and allowing the component to react with, as an alcohol component, polyhydric alcohol such as ethylene glycol, propylene glycol, diethylene glycol, dipropylene glycol, 1,2-butanediol, 1,3-butanediol, 1,5-pentanediol, 1,6-hexanediol, 2-methyl-1,3-propanediol, 2,2-dimethyl-1,3-propanediol, cyclohexane-1,4-dimethanol, an ethylene oxide adduct of bisphenol A or a propylene oxide adduct of bisphenol A, and when necessary, by adding as an acid component also polybasic acid having no polymerizable unsaturated bond, such as phthalic acid, isophthalic acid, terephthalic acid, tetrahydrophtalic acid, adipic acid and sebacic acid, or anhydride thereof.

Specific examples of the polyester(meth)acrylate resin include (1) (meth)acrylate obtained by allowing polyester having a terminal carboxyl group as obtained from polyhydric alcohol and saturated polybasic acid and/or unsaturated polybasic acid to react with an epoxy compound containing an α,β-unsaturated carboxylic acid ester group, (2) (meth)acrylate obtained by allowing polyester having a terminal carboxyl group as obtained from polyhydric alcohol and saturated polybasic acid and/or unsaturated polybasic acid to react with acrylate containing a hydroxy group, and (3) (meth)acrylate obtained by allowing polyester having a terminal hydroxy group as obtained from polyhydric alcohol and saturated polybasic acid and/or unsaturated polybasic acid to react with (meth)acrylic acid.

Specific examples of the saturated polybasic acid used as a raw material of polyester(meth)acrylate include polybasic acid having no polymerizable unsaturated bond, such as phthalic acid, isophthalic acid, terephthalic acid, tetrahydrophthalic acid, adipic acid and sebacic acid, or anhydride thereof, and polymerizable unsaturated polybasic acid such as fumaric acid, maleic acid and itaconic acid, or anhydride thereof. Further, specific examples of a polyhydric alcohol component include the component similar to the component in the unsaturated polyester.

Specific examples of the epoxy(meth)acrylate resin that can be used in the invention include a product obtained by dissolving into a polymerizable monomer a compound (vinyl ester) having a polymerizable unsaturated bond formed by a ring-opening reaction between a compound having a glycidyl group (epoxy group), and a carboxyl group of a carboxyl compound having the polymerizable unsaturated bond, such as acrylic acid.

Specific examples of the vinyl ester include a product produced by a publicly known method and include epoxy (meth)acrylate obtained by allowing unsaturated monobasic acid such as acrylic acid or methacrylic acid to react with an epoxy resin.

Moreover, various kinds of epoxy resins may be allowed to react with dibasic acid such as bisphenol (A type, for example), adipic acid, sebacic acid or dimer acid (Haridimer 270S: Harima Chemicals, Inc.) to provide the product with flexibility.

Specific examples of the epoxy resin as a raw material include bisphenol A diglycidyl ether and a high-molecular weight homolog thereof, and novolac glycidyl ethers.

Specific examples of the urethane(meth)acrylate resin include an oligomer containing a radically polymerizable unsaturated group that can be obtained by allowing polyisocyanate to react with a polyhydroxy compound or polyhydric alcohols, and then allowing a hydroxy group-containing (meth)acrylic compound and when necessary a hydroxy group-containing allyl ether compound to react with the resulting reaction product.

Specific examples of the polyisocyanate include 2,4-tolylene diisocyanate and an isomer thereof, diphenylmethane diisocyanate, hexamethylene diisocyanate, hydrogenated xylylene diisocyanate, isophorone diisocyanate, xylylene diisocyanate, dicyclohexylmethane diisocyanate, naphthalene diisocyanate, triphenylmethane triisocyanate, Burnock D-750, Chrisvon NK (trade names: made by Dainippon Ink & Chemicals, Inc.), Desmodur L (trade name: made by Sumika Bayer Urethane Co. Ltd.), Coronate L (trade name: made by Nippon Polyurethane Industry Co., Ltd.), Takenate D102 (trade name: made by Mitsui Takeda Chemicals Inc.) and Isonate 143L (trade name: made by Mitsubishi Chemical Corporation).

Specific examples of the polyhydroxy compound include polyester polyol and polyether polyol, such as a glycerol-ethylene oxide adduct, a glycerol-propylene oxide adduct, a glycerol-tetrahydrofuran adduct, a glycerol-ethylene oxide-propylene oxide adduct, a trimethylolpropane-ethylene oxide adduct, a trimethylolpropane-propylene oxide adduct, a trimethylolpropane-tetrahydrofuran adduct, a trimethylolpropane-ethylene oxide-propylene oxide adduct, a dipentaerythritol-ethylene oxide adduct, a dipentaerythritol-propylene oxide adduct, a dipentaerythritol-tetrahydrofuran adduct and a dipentaerythritol-ethylene oxide-propylene oxide adduct.

Specific examples of the polyhydric alcohols include ethylene glycol, diethylene glycol, triethylene glycol, polyethylene glycol, propylene glycol, dipropylene glycol, polypropylene glycol, 2-methyl-1,3-propanediol, 1,3-butanediol, an adduct of bisphenol A and propylene oxide or ethylene oxide, 1,2,3,4-tetrahydroxybutane, glycerol, trimethylolpropane, 1,2-cyclohexane glycol, 1,3-cyclohexane glycol, 1,4-cyclohexane glycol, paraxylene glycol, bicyclohexyl-4,4-diol, 2,6-decalin glycol and 2,7-decalin glycol.

The hydroxy group-containing (meth)acrylic ester is not particularly limited, and preferably includes hydroxy group-containing (meth)acrylate. Specific examples thereof include 2-hydroxyethyl(meth)acrylate, 2-hydroxypropyl (meth)acrylate, 3-hydroxybutyl(meth)acrylate, polyethylene glycol mono(meth)acrylate, polypropylene glycol mono (meth)acrylate, di(meth)acrylate of tris(hydroxyethyl)isocyanuric acid and pentaerythritol tri(meth)acrylate.

Specific examples of the thermosetting resin include a phenolic resin, an alkyd resin, a melamine resin, an epoxy resin, a urea resin, an unsaturated polyester resin, a urethane resin, a thermosetting polyimide resin and a silicone resin. The resins may be used alone or in combination of plurality of the resins.

Specifically, such a resin is preferred on processability as an epoxy resin including a bisphenol A epoxy resin, a bisphenol F epoxy resin, a polyfunctional epoxy resin, a flexible epoxy resin, a brominated epoxy resin, a glycidyl ester epoxy resin, a polymer epoxy resin and a biphenyl epoxy resin, a melamine resin including a methylated melamine resin, a butylated melamine resin, a methyl-etherized melamine resin, a butyl-etherized melamine resin and a methyl butyl mixed-etherized melamine resin, and a urethane resin that can be obtained by a reaction between a polyisocyanate compound (O=C=N—R—N—C=O) having two or more isocyanate groups, and a polyol compound (HO—R'—OH) having two or more hydroxy groups, polyamine ($H_2N$—R"—$NH_2$) or a compound having active hydrogen (—$NH_2$, —NH, —CONH—) such as water on processability.

The epoxy resin has excellent heat resistance, adhesiveness and chemical resistance, the melamine resin has excellent heat resistance, hardness and transparency, and the urethane resin has excellent adhesiveness and low-temperature curability, and the resin can be appropriately selected and used.

The active energy ray-curable resin can be cured by being irradiated with an active energy ray source, preferably ultraviolet light (UV), electron beams or the like.

A case where the active energy ray-curable resin is irradiated with UV and used for is described. The active energy ray-curable resin is preferably cured by being irradiated with UV to be polymerized in the presence of a photopolymerization initiator. Specific examples of the photopolymerization initiator include various kinds of benzoin derivative, a benzophenone derivative, a phenyl ketone derivative, an onium salt photoinitiator, an organic metal photoinitiator, a metal salt cationic photoinitiator, photodegradable organosilane, latent sulfonic acid and phosphine oxide. An amount of addition of the photopolymerization initiator is preferably adjusted to 1 to 5 parts by weight based on 100 parts by weight of the active energy ray-curable resin.

The thermosetting resin is required to be rapidly cured in a desired curing temperature (80 to 160° C.) and period of time (30 to 180 seconds). A curing reaction initiator or a curing reaction promoter may be used depend on kinds of resins. Specific examples in the case of the epoxy resin include amines such as aliphatic amine or aromatic amine, a polyamide resin, tertiary amine and secondary amine, imidazoles, polymercaptan, acid anhydrides, a Lewis acid complex, and specific examples in the case of the melamine resin include a sulfonic acid catalyst, and specific examples in the case of the urethane resin include an organic metal urethanization catalyst and tertiary amine urethanization catalyst.

A ratio of mixing the active energy ray-curable resin and the thermosetting resin is preferably 80:20 to 30:70 in terms of a weight ratio. If the thermosetting resin is mixed in an amount of 20% by weight or more, heat resistance and solvent resistance can be exhibited, and if the thermosetting resin is mixed in an amount of 70% by weight or less, the mixture is suitable for in-mold molding (particularly followability to the mold).

A film thickness of topcoat layer L2 is preferably 0.1 to 50 micrometers, and further preferably 1 to 20 micrometers. If the film thickness of topcoat layer L2 is 0.1 micrometer or more, cross-linked structure of the thermosetting resin is easily formed, and therefore reduction of durability or chemical resistance is hard to occur. Moreover, if the film thickness is 50 micrometers or less, a remaining solvent amount during drying of the solvent increases and insufficiency of hardness and durability of the coated film after being cured can be avoided.

Topcoat layer L2 is laminated on release layer L1 by applying an application liquid containing as a main component the resin on release layer L1, and heating, dry and curing the resulting coated film. The application liquid can be prepared by mixing, in addition to the resin when necessary, various kinds of additives such as wax, silica, a plasticizer, a levelling agent, a surfactant, a dispersing agent and a defoaming agent, and a solvent. For lamination, the wet coating method according to which the application liquid is uniformly coated is preferably applied.

In formation of topcoat layer L2, conditions under which the thermosetting resin is thermally set are satisfactorily applied. Heating is satisfactorily performed, for example ordinarily at a heating temperature of 80 to 160° C., and preferably at a heating temperature of 120 to 150° C. When an oven is used, heating is satisfactorily performed for 30 to 180 seconds. When the heating temperature is low or the heating time is short, the solvent possibly remains and crosslinking and curing of the thermosetting resin are possibly insufficient. Moreover, when the heating temperature is high or the heating time is long, a thermowave occurs in the base film. Depending on kinds of the resins and a mixture ratio, proper processing conditions are appropriately selected.

A surface modification function may also be provided for the topcoat layer. For example, a water-repellent and oil-repellent function or the antifouling function may be provided by using a surface modifier such as a silicone compound, a fluorine compound or a fluorosilsesquioxane-containing compound. Low reflection treatment (AR treatment) using an organic or inorganic low refractive index material or high refractive material may also be applied to provide the layer with an antireflection function. Moreover, an anti-glare treatment agent containing organic or inorganic particles may be used to provide the layer with an anti-glare function. Water-repellency and oil-repellency may be further adjusted to provide the layer with a fingerprint adhesion suppression and prevention function or the like. As shown in FIG. 1(a), the surface modification of the topcoat layer can be performed by adding a compound that develops the surface modification function to the application liquid for topcoat layer L2 to form topcoat layer L2. Alternatively, as shown in FIG. 1(b), surface modification layer L2a containing the compound that develops the surface modification function may be formed to form topcoat layer L2' having surface modification layer L2a. The compound (resin or the like) that develops the surface modification function is preferably appropriately selected according to a required function.

When topcoat layer L2' having a surface modification layer is formed, an application liquid containing as a main component a compound that develops the surface modification function is first prepared, and then is applied on release layer L1, and then the resulting coated film is, when necessary heated and dried, and cured (formation of L2a). Subsequently, the application liquid for topcoat layer L2 is applied on surface modification layer L2a, and the resulting coated film is heated and dried, and cured (formation of L2b). Thus, base L0 and release layer L1 are peeled and removed from the transfer film for in-mold molding during transfer, and therefore topcoat layer L2' having surface modification layer L2a can be formed on a surface side.

A case where the antifouling function as the surface modification function is provided for the topcoat layer includes a method using an antifouling agent with which adhesion of dirt is reduced. As the antifouling agent, one or more kinds of compounds selected from the group of a silicone compound, a fluorine compound, fluorosilsesquioxane and a fluorosilsesquioxane polymer described in WO 2008/072766 A and WO 2008/072765 A are preferred.

Specific examples of the silicone compound include BYK-UV3500 and BYK-UV-3570 (all, made by BYK-Chemie Gmbh), TEGO Rad2100, 2200N, 2250, 2500, 2600 and 2700 (all, made by Degussa AG), X-22-2445, X-22-2455, X-22-2457, X-22-2458, X-22-2459, X-22-1602, X-22-1603, X-22-1615, X-22-1616, X-22-1618, X-22-1619, X-22-2404, X-22-2474, X-22-174DX, X-22-8201, X-22-2426, X-22-164A and X-22-164C (all, made by Shin-Etsu Chemical Co., Ltd.)

Specific examples of the fluorine compound include OPTOOL DAC, OPTOOL DAC-HP, R-1110, R-1210, R-1240, R-1620, R-1820, R-2020, R-5210, R-5410, R-5610, R-5810, R-7210 and R-7310, made by Daikin Industries, Ltd.

Further, examples of the compound that develops the surface modification function may include a fluorosilsesquioxane compound having molecular structure shown in formula (I) below and a polymer containing the fluorosilsesquioxane compound (homopolymer or copolymer). The polymer in which polymerization is performed by using the compound shown in formula (I) below is a fluorine-based silicone compound, and therefore can provide topcoat layer L2 (L2') with a function of reducing adhesion of dirt. As described in Examples 4 and 5, high hardness can be actually achieved, and simultaneously water-repellency and oil-repellency that lead to provision of an antifouling and fingerprint-resistant function can be improved by achieving low surface free energy.

Formula 1

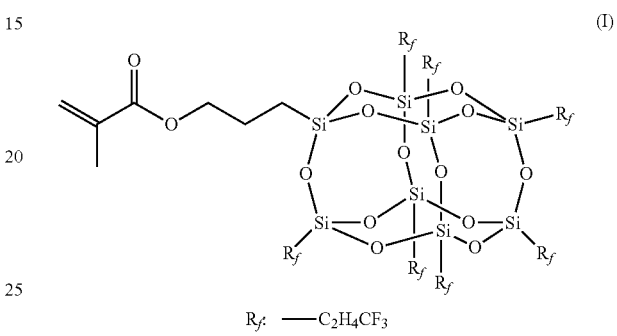

When the compound that develops the surface modification function is added to the application liquid for topcoat layer L2, the compound is preferably directly added to the application liquid or the compound is dissolved into an organic solvent, and then the compound is preferably added to the application liquid. An addition amount is preferably adjusted to 0.1 to 20% by weight based on the total amount of the resin (active energy ray-curable resin and thermosetting resin) required for formation of the topcoat layer. If a ratio of the compound that develops the surface modification function is 20% by weight or more, settability of the resin required for formation of the topcoat layer is inhibited to easily cause reduction of adhesion. Moreover, if the ratio is 0.1% by weight or less, such a ratio is difficult to sufficiently develop the surface modification function.

When topcoat layer L2' having the surface modification layer is formed, for example, the compound is dissolved into the organic solvent to separately prepare the application liquid. For application, the wet coating method according to which the application liquid is uniformly coated is preferably applied. When applicability is taken into consideration, the application liquid for surface modification layer L2a is preferably used to be about 10 to 80% by weight in a content of the compound. A film thickness of surface modification layer L2a is preferably 0.01 to 10 micrometers. If the film thickness is 0.01 micrometer or more, the surface modification function can be developed. Moreover, if the film thickness is 10 micrometers or less, a remaining solvent amount during drying of the solvent increases and insufficiency of hardness and durability of the coated film after being set can be avoided.

Anchor Layer L3

Anchor layer L3 is described with reference to FIG. 1(a). Anchor layer L3 is a layer for improving adhesion (allowing adhesiveness) between topcoat layer L2 and a layer laminating on topcoat layer L2. Specific examples of materials of anchor layer L3 include a thermosetting resin such as a phenolic resin, an alkyd resin, a melamine resin, an epoxy resin, a urea resin, an unsaturated polyester resin, a urethane resin, a thermosetting polyimide resin and a silicone resin, and a thermoplastic resin such as a vinyl chloride-vinyl acetate copolymer resin, an acrylic resin, chlorinated rubber, a polyamide resin, a nitrocellulose resin and a cyclic polyolefin resin.

Specifically, such a resin is preferred on processability as an epoxy resin including a bisphenol A epoxy resin, a bisphenol F epoxy resin, a polyfunctional epoxy resin, a flexible epoxy resin, a brominated epoxy resin, a glycidyl ester epoxy resin, a polymer epoxy resin and a biphenyl epoxy resin, a melamine resin including a methylated melamine resin, a butylated melamine resin, a methyl-etherized melamine resin, a butyl-etherized melamine resin and a methyl butyl mixed-etherized melamine resin, and a urethane resin that can be obtained by a reaction between a polyisocyanate compound (O=C=N—R—N—C=O) having two or more isocyanate groups, and a polyol compound (HO—R'—OH) having two or more hydroxy groups, polyamine ($H_2N$—R''—$NH_2$) or a compound having active hydrogen (—$NH_2$, —NH, —CONH—) such as water.

Anchor layer L3 may be composed of a plurality of thermosetting resins. For example, anchor layer L3 is composed of the epoxy resin and the urethane resin. Adhesion between anchor layer L3 and topcoat layer L2 can be improved by incorporating the epoxy resin into anchor layer L3 and topcoat layer L2, respectively. Adhesion between anchor layer L3 and conductor layer L4 can be improved by incorporating the urethane resin into anchor layer L3 and conductor layer L4, respectively. Adhesion between topcoat layer L2 and anchor layer L3 and between anchor layer L3 and conductor layer L4 is improved to prevent layers from being peeled, and thus a film having excellent durability can be produced.

Moreover, while the film has thermosettability, stretchability of the layer can be maintained by using the urethane resin. Thus, elongation (softness) so as to follow the mold upon injection molding can be maintained.

A preferred mixture ratio when the epoxy resin and the urethane resin are used for anchor layer L3 is 5:95 to 50:50 in terms of a weight ratio. If the epoxy resin is mixed in an amount of 5% by weight or more, adhesion with topcoat layer L2 can be improved, and if the epoxy resin is mixed in an amount of 50% by weight or less, such a ratio is suitable for in-mold molding (particularly followability to the mold).

A film thickness of anchor layer L3 is preferably 0.1 to 50 micrometers, and further preferably 0.5 to 10 micrometers. If the film thickness of anchor layer L3 is 0.1 micrometer or more, cross-linked structure of the thermosetting resin is easily formed, and therefore reduction of durability or chemical resistance is hard to occur. Moreover, if the film thickness is 50 micrometers or less, a remaining solvent amount during drying of the solvent increases and insufficiency of blocking resistance can be avoided.

Anchor layer L3 is laminated on topcoat layer L2 by applying an application liquid containing as a main component the resin onto topcoat layer L2, and heating, dry and curing the resulting coated film. The application liquid can be prepared by mixing, in addition to the resin, when necessary, various kinds of additives such as wax, silica, a plasticizer, a levelling agent, a surfactant, a dispersing agent and a defoaming agent and a solvent. For lamination, the wet coating method according to which the application liquid is uniformly coated is preferably applied.

In formation of anchor layer L3, conditions under which the thermosetting resin is thermally set are satisfactorily applied. Heating is satisfactorily performed, for example ordinarily at a heating temperature of 80 to 160° C., and preferably at a heating temperature of 120 to 150° C. When an oven is used, heating is satisfactorily performed for 30 to 180 seconds. When the heating temperature is low or the heating time is short, the solvent possibly remains and crosslinking and curing of the thermosetting resin are possibly insufficient. Moreover, when the heating temperature is high or the heating time is long, a thermowave occurs in the base film. Depending on kinds of the resins and a mixture ratio, proper processing conditions are appropriately selected.

To anchor layer L3, an ultraviolet light absorber, an ultraviolet light stabilizer or an antioxidant may be added when necessary for the purpose of preventing deterioration, discoloration or the like of conductor layer L4 and printing layer L5.

Specific examples of the ultraviolet light absorber include benzotriazoles, hydroxyphenyl triazines, benzophenones, salicylates, cyanoacrylates or triazines. Moreover, specific examples of the ultraviolet light stabilizer include a hindered amine light stabilizer. Moreover, specific examples of the antioxidant include a phenol-based antioxidant, sulfur-based antioxidant or phosphoric acid-based antioxidant.

An amount of addition of the additive is preferably adjusted to 0.01 to 20 parts by weight based on 100 parts by weight of the resin that forms anchor layer L3.

Conductor Layer L4

Conductor layer L4 is described with reference to FIG. 1(a). On anchor layer L3, conductor layer L4 for providing the transfer film for in-mold molding with electrical conductivity is laminated. Conductor layer L4 has excellent followability to the mold, in in-mold molding, and even if conductor layer L4 is transferred onto the transfer object having a complicated shape, no loss of electrical conductivity is caused.

Conductor layer L4 is laminated on anchor layer L3, for example by applying an application liquid containing at least one kind selected from the group of the flexible metal, carbon and conductive polymer thereonto, and heating and drying the resulting coated film. For lamination, the wet coating method according to which the application liquid is uniformly coated is preferably applied. Further, as a coating method, a printing system such as gravure printing, screen printing, offset printing, flexography and on-demand printing may also be applied.

Specific examples of the metal include metallic particles (metal nanowires or metal nanotubes) of gold, silver, copper, platinum, nickel, palladium and silicon. In addition, the metal includes an elemental metal, a metal alloy and a metallic compound (including metal oxide). Specific examples of carbon include carbon nanofibers, carbon nanotubes and graphene. Specific examples of the conductive polymer include polypyrrole, polyaniline, polythiophene and a derivative thereof, and PEDOT/PSS. Silver nanowires and carbon nanofibers are particularly preferred due to versatility, actual performance also in wet coating and keeping stable electrical conductivity. The electrically conducting material is a continuous material even when the material is stretched, and therefore an electric conduction path can be easily maintained.

Moreover, in conductor layer L4, the thermosetting resin or the thermoplastic resin that is described as the material of anchor layer L3 may be contained.

In formation of conductor layer L4, conditions under which the solvent is dried to immobilize the coated film may be applied. Heating is satisfactorily performed, for example ordinarily at a heating temperature of 80 to 160° C., and preferably at a heating temperature of 120 to 150° C. When an oven is used, heating is satisfactorily performed for 30 to 180 seconds. When the heating temperature is low or the heating time is short, the solvent possibly remains and film-formability is possibly damaged. Moreover, when the heating temperature is high or the heating time is long, a thermowave occurs. Depending on kinds of the resins and a mixture ratio, proper processing conditions are appropriately selected.

A film thickness of conductor layer L4 is preferably 10 nanometers to 2 micrometers, and further preferably 10 to 100 nanometers. If the film thickness of conductor layer L4 is 10 nanometers or more, the layer in formed into no discontinuous film, and stability of the film can be maintained. On the other hand, if the film thickness is 2 micrometers or less, a remaining solvent amount during drying of the solvent increases and insufficiency of blocking resistance can be avoided.

Printing Layer L5/Adhesive Layer L6

Printing layer L5/adhesive layer L6 is described with reference to FIG. 1(a). On conductor layer L4, printing layer L5 for providing transfer film F10 for in-mold molding with decoration such as a picture, and adhesive layer L6 for allowing printing layer L5 to adhere onto the resin subjected to injection molding, or the like during in-mold molding are formed.

The decoration conceivably includes coloring, a pattern or a shape. If transparent ink is used in printing layer L5, a transparent transfer film for in-mold molding can be produced. When the transparent film is used, for example, when the resin from which the transfer object is formed is the transparent resin such as a polymethyl methacrylate resin (PMMA), a cycloolefin resin and a polycarbonate resin, a transparent and electrically conductive molded product can be formed.

Specific examples of materials of printing layer L5 include coloring ink containing as a binder a resin such as an acrylic resin, a nitrocellulose resin, a polyurethane resin, a chlorinated rubber resin, a vinyl chloride-vinyl acetate copolymer resin, a polyamide resin, a polyester resin and an epoxy resin, and containing as a colorant a pigment or a dye having suitable color.

In adhesive layer L6, such a material can be used alone or mixed and used as an adhesive of an acrylic resin, an acryl-modified vinyl resin, an acrylonitrile-butadiene-styrene copolymer resin (ABS), a polyvinyl chloride resin, a polyurethane resin, a polystyrene resin, a polyamide resin and a polyester resin, in which such an adhesive is adjusted to a suitable concentration by using a solvent. Moreover, a hot-melt adhesive of an acetate resin, an elastomer resin, an olefin resin or the like can also be used.

Moreover, as shown in FIG. 1(a), the film may have protective layer L7 for anti-blocking or prevention of static charge on one surface of base L0 (lower side of base L0 in FIG. 1(a)). When protective layer L7 has anti-blocking properties, blocking when the film is wound around a roll can be suppressed in a process of producing the film. Moreover, when protective layer L7 has antistatic properties, peeling charge upon unwinding of the film from the roll can be suppressed in the process of producing the film. As the material that composes protective layer L7, a coating agent containing various kinds of inorganic particles, organic particles, quaternary ammonium salt, siloxane, a surfactant or the like may be used.

As described above, as the transfer film for in-mold molding as related to the first embodiment, a film having the layer structure of base L0/release layer L1/topcoat layer L2/anchor layer L3/conductor layer L4/printing layer L5/adhesive layer L6 is described, but the layer structure is not limited thereto.

For example, the release performance may also be provided for base L0. When the release performance is provided for base L0, transfer layer 11 (topcoat layer L2 or the like) can be easily peeled from base L0, and release layer L1 can be omitted. Further, for example, an order of lamination of conductor layer L4 and printing layer L5 may be changed to have structure: L0/L1/L2/L3/L5/L4/L6. The film may have structure in which conductor layer L4 is interposed between printing layers L5 to have structure: L0/L1/L2/L3/L5/L4/L5/L6. The film may be a film having no printing layer L5, for example to have structure: L0/L1/L2/L4/L6 or L0/L1/L2/L3/L4/L6. Ink or the like may be incorporated into conductor layer L4, and the conductor layer and the printing layer may integrally formed to omit printing layer L5.

Thus, the layer structure is not particularly limited, as long as the structure functions as the transfer film for in-mold molding.

Method for Producing Transfer Film for in-Mold Molding and Molded Product

Figure 2:
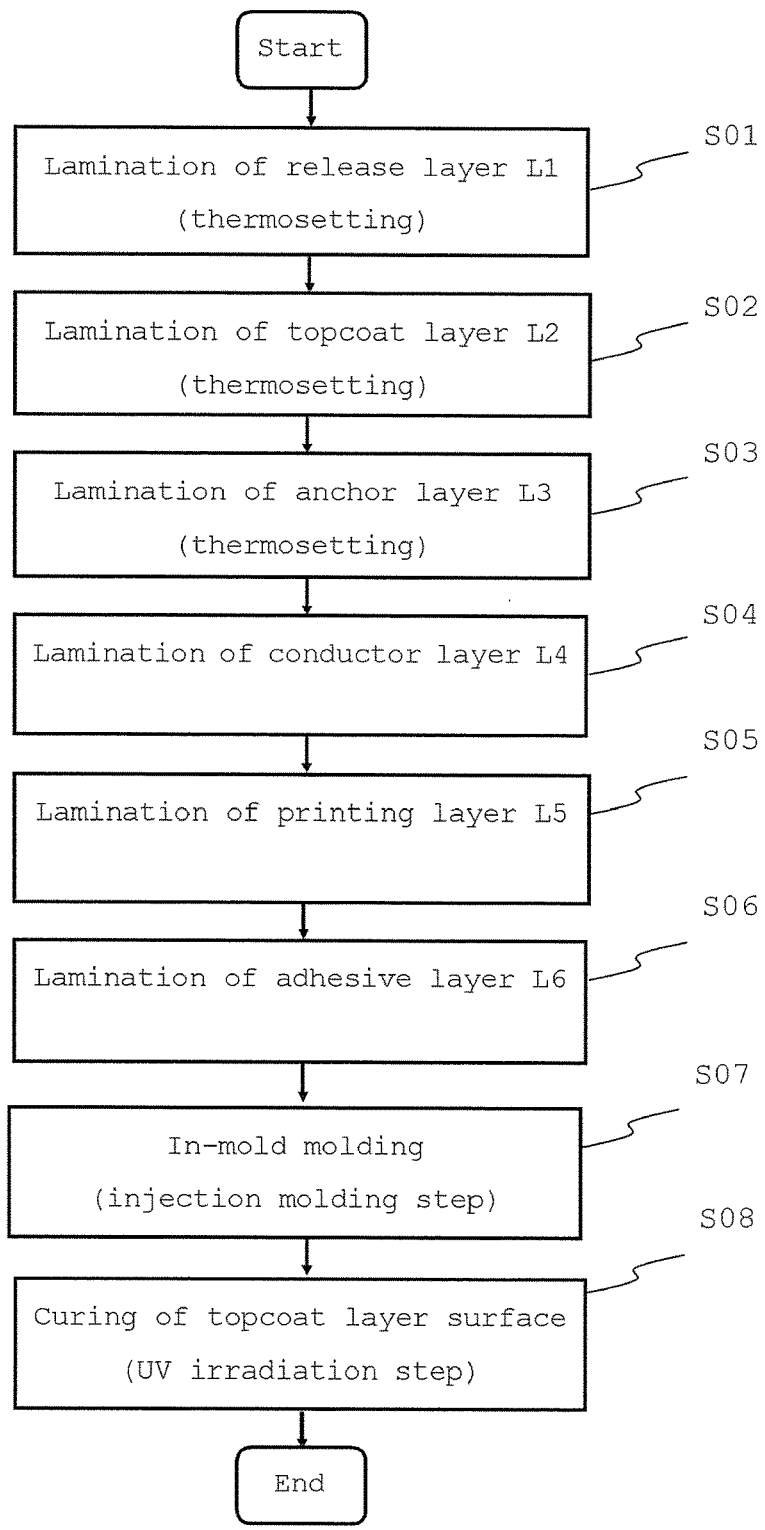
FIG. 2 is a flow diagram showing a method for producing a transfer film for in-mold molding and a molded product.

A method for producing a transfer film for in-mold molding and a molded product as related to the second embodiment of the invention is described with reference to FIG. 1(a) and FIG. 2. In the present embodiment, a case where release layer L1 is laminated and protective layer L7 is omitted is described. However, when base L0 has releasability, release layer L1 can also be omitted. First, release layer L1 is laminated on one surface of base L0 by the wet coating method, and then thermally set (S01). Next, topcoat layer L2 is laminated on release layer L1 by the wet coating method, and then thermally set (S02). Next, anchor layer L3 is laminated on topcoat layer L2 by the wet coating method, and then thermally set (S03). Further, conductor layer L4 is laminated on anchor layer L3 (S04). Further, printing layer L5 is laminated on conductor layer L4 (S05). Finally, adhesive layer L6 is laminated on printing layer L5 (S06). Lamination is performed by the wet coating method, and therefore lamination can be performed at a line speed of several tens of meters per minute (about 20 m/min, for example), and production efficiency can be improved. In steps S01 to S03, the layer is thermally set each time wet coating is performed, and therefore while avoiding mixing of the application liquids, each layer can be positively formed. Thermosetting is preferably performed at a degree at which elongation required for injection molding in a post-step is not adversely affected.

In addition, in the steps of S01 to S06, the order is appropriately changed according to the layer structure of the transfer film for in-mold molding to be produced.

In the thus produced transfer film for in-mold molding, the transfer layer is transferred onto the resin or the like to be subjected to injection molding in in-mold molding (injection molding step S07) as described later, and peeled from the transfer film for in-mold molding (remaining film remains). Thus, the in-mold molded product is formed by the transfer layer and the resin.

As the resin for injection molding, such a resin is preferably used as a thermoplastic resin including a polyester resin, an acetate resin, a polyether sulphone resin, an acrylonitrile-butadiene-styrene copolymer resin (ABS), a polycarbonate resin, a polyamide resin, a polyimide resin, a polyolefin resin, a (meth)acrylic resin, a polyvinyl chloride resin, a polyvinylidene chloride resin, a polystyrene resin, a polyvinyl alcohol resin, a polyarylate resin, a polyphenylene sulfide resin, a modified polyphenylene ether resin and a cyclic polyolefin resin.

In addition, in curing of a topcoat layer surface (S08), the transferred transfer layer is irradiated with the active energy ray (UV, for example). The active energy ray-curable resin contained therein is cured by irradiation to further improve the hardness of the topcoat layer on the surface the in-mold molded product.

In the thus produced transfer film for in-mold molding, topcoat layer L2 is composed by mixing the thermosetting resin with the active energy ray-curable resin. The thermosetting resin contained in topcoat layer L2 is set by heating (during drying, for example) prior to in-mold molding to prepare the topcoat layer L2 so as to have a certain degree of hardness even before irradiation with the active energy ray (for example, UV).

In injection molding in in-mold molding, the resin enters into the mold through a pin gate (one gate) or a valve gate (one gate) and the resin spreads to obtain the in-mold molded product. Upon injection molding, heat and pressure are applied to a part with which the resin melted to some extent (about 260° C.) is brought into contact. Therefore, gate flow occurs in which a layer in the part flows.

In the transfer film for in-mold molding of the invention, the gate flow is suppressed by thermosetting of topcoat layer L2 and thermosetting of anchor layer L3. On the other hand, topcoat layer L2 contains the active energy ray-curable resin before being cured, and therefore can maintain moldability (particularly followability to the mold) required for injection molding.

Further, the transfer film for in-mold molding has the conductor layer having excellent followability to the mold, and therefore causes no loss of electrical conductivity even when the transfer layer is transferred onto the transfer object having the complicated shape.

Thus, according to the method for producing the transfer film of the invention, the transfer film for in-mold molding in which the transfer film has excellent moldability, heat resistance, durability and also electrical conductivity can be obtained.

An example of use of the transfer film for in-mold molding is shown in FIG. 3.

In-Mold Molding (Injection Molding Step S07)

Injection molding step S07 is described by using the thus produced transfer film (transfer film F10) for in-mold molding. In addition, transfer film F10 has no protective layer L7.

1. Film Feed

Transfer film F10 is fed from a film feed device such that a PET base side is faced on a side of a mold (mold on an observer's left side in FIG. 3), and guided to a predetermined position by a sensor fixed to the mold.

2. Suction

Transfer film F10 is clamped and then sucked to be formed into a shape of the mold.

3. Injection Molding

The mold is closed and the resin is subjected to injection molding.

4. Transfer

A dismounting robot goes into the mold and an in-mold molded product (molded product 13) is protruded from a fixed side (the transfer layer is peeled from remaining film 12, and transferred on the resin to compose molded product 13).

Curing of Topcoat Layer Surface (UV Irradiation Step S08)

A surface of the topcoat layer is irradiated with an active energy ray to cure an active energy ray-curable resin in the topcoat layer.

As a curing method by UV irradiation for curing the active energy ray-curable resin, the topcoat layer may be irradiated with UV having a wavelength of 200 to 400 nanometers from a UV lamp (a high-pressure mercury lamp, an extra high-pressure mercury lamp, a metal halide lamp, a high power metal halide lamp, for example) for a short period of time (within the range of several seconds to several tens of seconds). Moreover, as a curing method by irradiation with electron beams, the topcoat layer may be irradiated with low-energy electron beams from a self-shielded low-energy electron accelerator having 300 keV or less.

Thus, the transfer film for in-mold molding according to the invention is used to allow decoration of a cellular phone terminal, a housing of a laptop computer, a digital camera or the like, other home appliances, a cosmetic container, and also automotive parts (such as a cylinder-head cover, a headlight, a tail lamp). Further, the transfer film for in-mold molding of the invention has excellent heat resistance, durability and moldability to allow greater surface protection. Moreover, the transfer film for in-mold molding according to the invention has the conductor layer, and therefore if the transfer film for in-mold molding is used for the headlight, structure can be formed in which power is distributed to the conductor layer to allow anti-freezing of the headlight in the coldest period. Further, as provision of electrical conductivity for various kinds of molded products having a three-dimensional shape, the transfer film for in-mold molding can be used in the fields of heaters, and also electromagnetic wave shield or a touch sensor.

EXAMPLES

The invention is described in more detail based on Examples. In addition, the invention is not limited by Examples described below. Each layer is expressed as base L0, release layer L1, topcoat layer L2, anchor layer L3, conductor layer L4, printing layer L5 and adhesive layer L6. However, for example, when several kinds of conductor layers L4 exist, and are necessary to be distinguished, the layers are expressed as L4-$x$ ($x$ is a numeral).

Formation of Transfer Film for in-Mold Molding 1

Example 1

Figure 4:
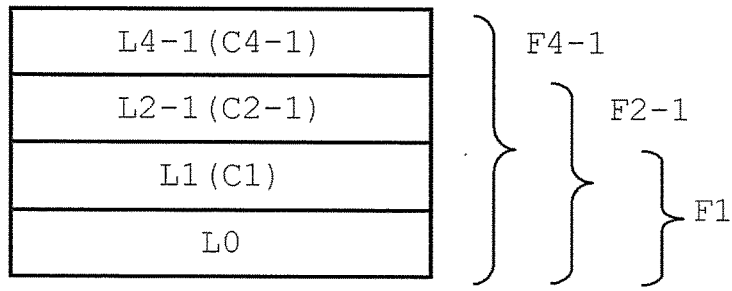
FIG. 4 is a diagram showing layer structure in Examples 1 and 2 and Comparative Examples 1 and 2.
Figure 4:
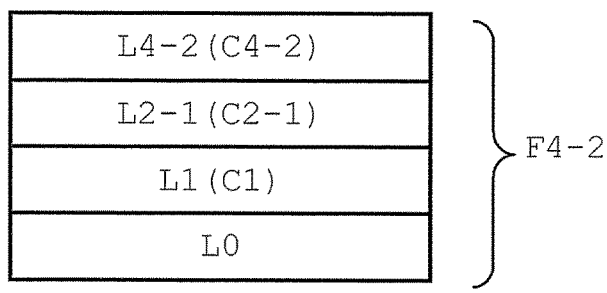
Figure 4:
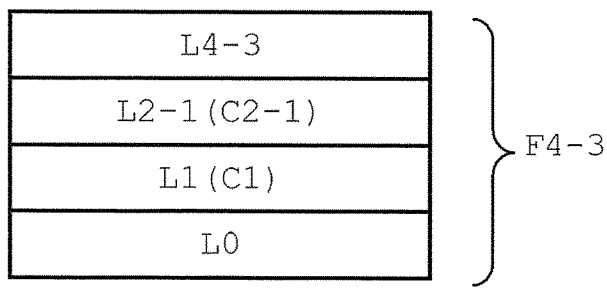
Figure 4:
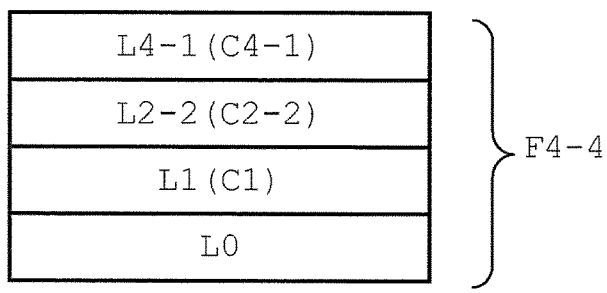

Layer structure is shown in FIG. 4.

Formation of Release Layer

Coating liquid C1 (resin component concentration: 10% by weight) was prepared in which coating liquid C1 was composed of 32.5% by weight of melamine release coating agent (ATOM BOND (trade name) RP-30, containing a resin component of about 30% by weight in the product, made by Mitsuwa Chemical Lab. Co., Ltd.), 64.9% by weight of toluene/xylene/2-butanone mixed solvent (ATOM BOND (trade name) R-thinner, made by Mitsuwa Chemical Lab. Co., Ltd.) as a diluent solvent and 2.6% by weight of para-toluene sulfonic acid ester (CP catalyst, made by Mitsuwa Chemical Lab. Co., Ltd.) as a catalyst.

The resulting coating liquid C1 was applied onto an easy-adhesion coat surface of a polyethylene terephthalate film (thickness: 50 micrometers, G440E) being base film L0, made by Mitsubishi Plastics Inc., by using a coating rod (#6) made by R. D. Specialties, Inc.

The resulting coated film was dried simultaneously with curing in a high-temperature chamber at 150° C. for 20 seconds to obtain film F1 having release layer L1 having a film thickness of 1 micrometer.

In addition, with regard to a film thickness of the coated film, a film thickness of a coated surface and a film thickness of a non-coated surface were measured by DIGIMICRO "MF-501+Counter TC-101" made by NIKON Corporation to calculate the film thickness from a difference in the film thicknesses thereof.

Formation of Topcoat Layer

Coating liquid C2-1 (resin component concentration: 30% by weight) was prepared in which coating liquid C2-1 was composed of 56.0% by weight of a UV-reactive acrylic resin (UVT Clear (trade name) NSF-001, containing about 37% by weight of resin component in the product, made by DIC Corporation) containing a photoinitiator as an active energy ray-curable resin, 9.0% by weight of an alicyclic polyfunctional epoxy resin (CELLOXIDE 3150 (trade name), epoxy equivalent: 180 g/mol, made by Daicel Corporation) as a thermosetting resin, 34.5% by weight of 2-butanone (MEK) as a diluent solvent and 0.5% by weight of cationic polymerization initiator (SAN-AID (trade name) SI-60, made by Sanshin Chemical Industry Co., Ltd.) as a curing agent.

The resulting coating liquid C2-1 was applied onto a surface of release layer L1 of film F1 by using a coating rod (#16) made by R. D. Specialties, Inc.

The resulting coated film was dried in a high-temperature chamber at 140° C. for 60 seconds to obtain film F2-1 having topcoat layer L2-1 having a film thickness of 4 micrometers.

Formation of Conductor Layer

A batch screen printer (MINOMAT-e, made by Mino Group Co., Ltd.) attached with a 300 mesh plate was used to apply coating liquid C4-1 (ClearOhm (trade name), made by Cambrios Technologies Corporation) containing silver nanowires onto a surface of topcoat layer L2-1 of film F2-1. The resulting coated film was dried in a high-temperature chamber at 120° C. for 60 seconds to obtain film F4-1 having conductor layer L4-1 having a film thickness of 50 nanometers.

Film F4-1 has film structure laminated in the order of base film L0 (PET), release layer L1, topcoat layer L2-1 and conductor layer L4-1.

Example 2

Layer structure is shown in FIG. 4.

Film F4-2 laminated in the order of base film L0 (PET), release layer L1, topcoat layer L2-1 and conductor layer L4-2 was obtained by performing operation in a manner similar to the operation in Example 1 except that coating liquid C4-2 (EP TDL-2MIBK (trade name), made by Mitsubishi Materials Electronic Chemicals Co., Ltd.) containing carbon nanofibers was used in placed of coating liquid C4-1, in formation of the conductor layer in Example 1, to obtain conductor layer L4-2 having a film thickness of 50 nanometers on the surface of topcoat layer L2-1 of film F2-1.

Comparative Example 1

Layer structure is shown in FIG. 4.

Film F4-3 laminated in the order of base film L0 (PET), release layer L1, topcoat layer L2-1 and conductor layer L4-3 was obtained by performing operation in a manner similar to the operation in Example 1 except that a target containing 98% by weight of indium oxide (ITO) and 2% by weight of tin oxide was used in place of coating liquid C4-1, in formation of the conductor layer in Example 1, to form conductor layer L4-3 having a film thickness of 50 nanometers on the surface of topcoat layer L2-1 of film F2-1 by a sputtering method.

Comparative Example 2

Layer structure is shown in FIG. 4.

Film F4-4 laminated in the order of base film L0 (PET), release layer L1, topcoat layer L2-2 and conductor layer L4-1 was obtained by performing operation in a manner similar to the operation in Example 1 except that coating liquid C2-2 (resin component concentration: 30% by weight) composed of 81.0% by weight of UV-reactive acrylic resin (UVT Clear (trade name) NSF-001, made by DIC Corporation) and 19.0% by weight of 2-butanone (MEK) containing a photoinitiator as a diluent solvent was used in place of coating liquid C2-1, in formation of the topcoat layer in Example 1, to obtain topcoat layer L2-2. More specifically, topcoat layer L2-2 contains no thermosetting resin.

Tests 1

Physical properties of the films (F4-1 to F4-4) obtained in Examples 1 and 2, and Comparative Examples 1 and 2 were measured by the methods described below.

(1) Crack Development Elongation

An acrylic resin pressure sensitive adhesive tape (No. 31B, tape width: 25 mm, made by Nitto Denko Corporation) was put on a conductor layer surface of a film, and then peeled to prepare a test specimen (25 mm width×200 mm length) in which a transfer layer (topcoat layer L2/conductor layer L4) was transferred on a tape pressure sensitive adhesive surface. The test specimen prepared was stretched using a tensile tester (Tensilon™-250, maximum load: 2.5 kN, made by ORIENTEC Co., Ltd) under conditions of a speed of 2 mm/min and an interchuck distance of 100 mm to measure a distance at which a crack was developed.

Crack Development Elongation was Measured by the Following Formula:

Crack development elongation=(crack development distance−interchuck distance)/interchuck distance×100.

(2) Surface Resistance Value

In a crack development elongation measurement in Test 1 above, a non-contact surface resistance measuring instrument "717B," made by Delcom Instruments, Inc. was used to measure a resistance value on a side of the topcoat layer surface of the test specimen that was elongated to an elongation of 2%.

TABLE 1

| | Film structure | Example 1 F4-1 | Example 2 F4-2 | Comparative Example 1 F4-3 | Comparative Example 2 F4-4 |
|---|---|---|---|---|---|
| Film structure | Conductor layer | L4-1 | L4-2 | L4-3 | L4-1 |
| | Topcoat layer | L2-1 | L2-1 | L2-1 | L2-2 |
| | Release layer | L1 | L1 | L1 | L1 |
| | Base | L0(PET) | L0(PET) | L0(PET) | L0(PET) |
| Film physical properties prior to UV irradiation | Crack development elongation (%) | 2.4 | 2.3 | 0.2 | 0.2 |
| | Resistance value ($\Omega/\square$) | 100 | 100 | $>10^4$ | $>10^4$ |

The films composed of the conductor layers using the electrically conducting materials that follow the elongation of the topcoat layers (Example 1, Example 2) are significantly improved in the crack development elongation, and electrical conductivity of the film after being elongated is also retained in comparison with Comparative Example 1 in which the electrically conducting material (ITO) that does not follow the elongation is used. In Comparative Example 1, the ITO layer is considered to cause cracking by stretching of the film into s state in which the electrically conducting path is disconnected, resulting in causing loss of electrical conductivity.

Moreover, in Comparative Example 2 in which no thermosetting resin is contained in the topcoat layer, crack development elongation is reduced. A case where the topcoat layer contains no thermosetting resin is also found to cause reduction of durability of the film and reduction of crack development elongation of the film.

A transfer film for in-molding mold in which the film has electrical conductivity similar to the electrical conductivity in Example 1 can be prepared even by using a PEDOT-PSS dispersion liquid of a conductive polymer (made by Sigma-Aldrich Corporation) in which followability can be expected in place of coating liquid C4-1 in formation of conductor layer L4 in Example 1.

Formation of Transfer Film for in-Mold Molding 2

Example 3

Figure 5:
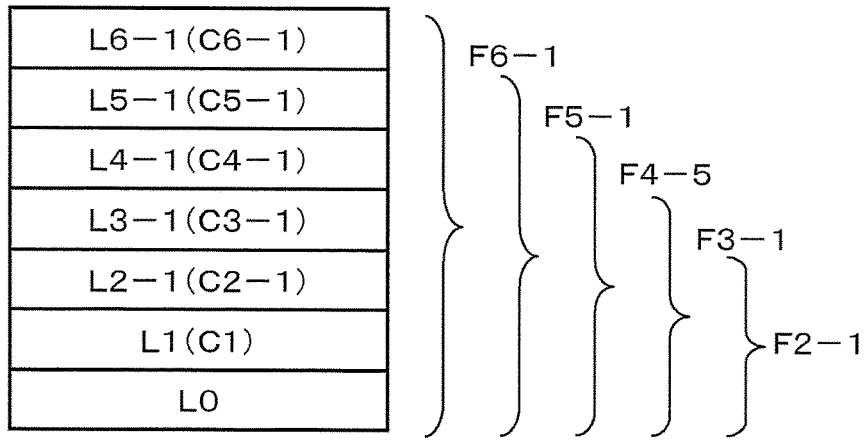
FIG. 5 is a diagram showing layer structure in Example 3 and Comparative Examples 3 and 4.
Figure 5:
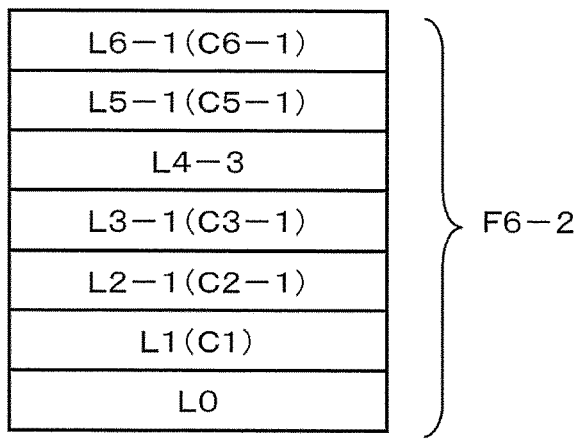
Figure 5:
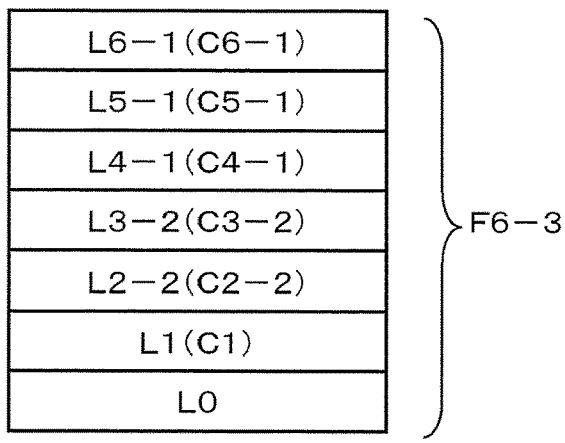

Layer structure is shown in FIG. 5.
Formation of Release Layer and Topcoat Layer Film F2-1 having release layer L1 and topcoat layer L2-1 was obtained by performing operation in a manner similar to the operation in Example 1, in formation of a release layer and a topcoat layer.
Formation of Anchor Layer Coating liquid C3-1 (resin component concentration: 20% by weight) was prepared in which coating liquid C3-1 was composed of 36.8% by weight of urethane resin (UC Sealer (trade name) NA-001, containing about 30% by weight of resin component in the product, DIC Corporation), 7.4% by weight of urethane curing agent (N-1, containing about 40% by weight of resin component in the product, DIC Corporation), 6.0% by weight of alicyclic polyfunctional epoxy resin (CELLOXIDE 3150 (trade name), epoxy equivalent: 180 g/mol, made by Daicel Corporation), 49.5% by weight of 2-butanone (MEK) and 0.3% by weight of cationic polymerization initiator (SAN-AID (trade name) SI-60, made by Sanshin Chemical Industry Co., Ltd.).

The resulting coating liquid C3-1 was applied onto a surface of topcoat layer L2 of film F2-1 by using a coating rod (#9) made by R. D. Specialties, Inc.

The resulting coated film was dried in a high-temperature chamber at 140° C. for 60 seconds to obtain film F3-1 having anchor layer L3-1 having a film thickness of 2 micrometers.
Formation of Conductor Layer A batch screen printer (MINOMAT-e, made by Mino Group Co., Ltd.) attached with a 300 mesh plate was used to apply coating liquid C4-1 (ClearOhm (trade name), made by Cambrios Technologies Corporation) containing silver nanowires onto anchor layer L3-1 surface of film F3-1. The resulting coated film was dried in a high-temperature chamber at 120° C. for 60 seconds to obtain film F4-5 having conductor layer L4-1 with a film thickness of 50 nanometers.
Formation of Printing Layer A batch type screen printer (MINOMAT-e, made by Mino Group Co., Ltd.) attached with a 300 mesh plate was used to apply coating liquid C5-1 (VIC(Z)710 black-VIC curing agent, made by Seiko Advance Ltd.) containing ink onto a surface of conductor layer L4-1 of film F4-5. The resulting coated film was dried in a high-temperature chamber at 80° C. for 30 minutes to obtain film F5-1 having a printing layer L5-1 having a film thickness of 4 micrometers.
Formation of Adhesive Layer A batch screen printer (MINOMAT-e, made by Mino Group Co., Ltd.) attached with a 300 mesh plate was used to apply coating liquid C6-1 (JT-27 Base Clear, made by Seiko Advance Ltd.) containing an adhesive onto a surface of printing layer L5-1 of film F5-1. The resulting coated film was dried in a high-temperature chamber at 80° C. for 60 minutes to obtain film F6-1 having adhesive layer L6-1 having a film thickness of 2 micrometers.

Film F6-1 has film structure laminated in the order of base film L0 (PET), release layer L1, topcoat layer L2-1, anchor layer L3-1, conductor layer L4-1, printing layer L5-1 and adhesive layer L6-1.

Layer structure is shown in FIG. 5.

Comparative Example 3

Film F6-2 laminated in the order of base film L0 (PET), release layer L1, topcoat layer L2-1, anchor layer L3-1, conductor layer L4-3, printing layer 5-1 and adhesive layer L6-1 was obtained by performing operation in a manner similar to the operation in Example 3 except that a target containing 98% by weight of indium oxide and 2% by weight of tin oxide was used in place of coating liquid C4-1, in formation of the conductor layer in Example 3, to form conductor layer L4-3 having a film thickness of 50 nanometer on a surface of anchor layer L3-1 of film F3-1 by a sputtering method.

Layer structure is shown in FIG. 5.

Comparative Example 4

Film F6-3 laminated in the order of base film L0 (PET), release layer L1, topcoat layer L2-2, anchor layer L3-2, conductor layer L4-1, printing layer L5-1 and adhesive layer L6-1 was obtained by performing operation in a manner similar to the operation in Example 3 except that coating liquid C2-2 described in Comparative Example 2 was used in place of coating liquid C2-1, in formation of the topcoat layer in Example 3, to obtain topcoat layer L2-2, and in formation of an anchor layer, coating liquid C3-2 (resin component concentration: 20% by weight) composed of 52.6% by weight of an urethane resin (UC Sealer (trade name) NA-001, made by DIC Corporation), 10.5% by weight of an urethane curing agent (N-1, made by DIC Corporation) and 36.9% by weight of 2-butanone (MEK) was used in place of coating liquid C3-1 to obtain anchor layer L3-2. More specifically, topcoat layer L2-2 contains no thermosetting resin, and anchor layer L3-2 does not contain the thermosetting resin identical with the resin in topcoat layer L2-2.

Tests 2

Physical properties of the films (F6-1 to F6-3) obtained in Example 3 and Comparative Examples 3 and 4 were measured by the methods described below.

(1) Crack Development Elongation

An acrylic resin pressure sensitive adhesive tape (No. 31B, tape width: 25 mm, made by Nitto Denko Corporation) was put on an adhesive layer surface of a film prior to being cured with UV, and then peeled to prepare a test specimen (25 mm width×200 mm length) in which a transfer layer (topcoat layer L2/anchor layer L3/conductor layer L4/printing layer L5/adhesive layer L6) was transferred on a tape pressure sensitive adhesive surface. The test specimen prepared was stretched using a tensile tester (Tensilon™-250, maximum load: 2.5 kN, made by ORIENTEC Co., Ltd) under conditions of a speed of 2 mm/min and an interchuck distance of 100 mm to measure a distance at which a crack was developed.

Crack Development Elongation was Measured by the Following Formula:

Crack development elongation=(crack development distance−interchuck distance)/interchuck distance×100.

(2) Peeling Force Measurement

A commercially available cellophane tape (CELLOTAPE (registered trademark) CT-24, tape width: 24 mm, made by Nichiban Co., Ltd.) was put on a surface of an adhesive layer of the film prior to being cured with UV and press-fixed in one reciprocal motion by a 2 kg pressure roller, and peeling force between release layer L1 and topcoat layer L2 of the film after 30 minutes from press-fitting was measured by a tensile tester (Strograph VES05D, maximum load capacity: 50 N, Toyo Seiki Seisaku-sho, Ltd.).

In addition, a measured value of peeling force was taken as a value (N/cm) obtained by dividing, by a tape width (cm), force (N) needed for peeling under conditions of an interchuck distance of 100 mm and a peeling speed of 300 mm/min at an angle of 180 degrees.

(3) Surface Resistance Value

In a crack development elongation measurement in Test 1 above, a non-contact surface resistance measuring instrument "717B," made by Delcom Instruments, Inc. was used to measure a resistance value on a side of the topcoat layer surface of the test specimen that was elongated to an elongation of 2%.

TABLE 2

| | Film structure | Example 3 F6-1 | Comparative Example 3 F6-2 | Comparative Example 4 F6-3 |
|---|---|---|---|---|
| Film structure | Adhesive layer | L6-1 | L6-1 | L6-1 |
| | Printing layer | L5-1 | L5-1 | L5-1 |
| | Conductor layer | L4-1 | L4-3 | L4-1 |
| | Anchor layer | L3-1 | L3-1 | L3-2 |
| | Topcoat layer | L2-1 | L2-1 | L2-2 |
| | Release layer | L1 | L1 | L1 |
| | Base | L0(PET) | L0(PET) | L0(PET) |
| Film physical properties prior to UV irradiation | Crack development elongation (%) | 2.5 | 0.2 | 0.2 |
| | Peeling force (N/cm) | 0.12 | 0.12 | 0.12 |
| | Resistance value (Ω/□) | 100 | >$10^4$ | >$10^4$ |

The film (Example 3) in which the conductor layer using the electrically conducting material that follows the elongation of the topcoat layer is contained is significantly improved in the crack development elongation, and the electrical conductivity of the film after being elongated is also retained, in comparison with Comparative Example 3 in which the electrically conducting material that does not follow the elongation is used.

Moreover, in Comparative Example 4 in which the topcoat layer contains no thermosetting resin and the anchor layer does not contain the thermosetting resin identical with the resin in the top coat layer, crack development elongation is reduced. A case where the topcoat layer and the anchor layer contain no thermosetting resin is also found to cause reduction of crack development elongation of the film.

Tests 3

An injection molding test described below was conducted on the films (F6-1 to F6-3) obtained in Example 3 and Comparative Examples 3 to 4.

(1) Injection Molding Test

Films (F6-1 to F6-3) each were set to an injection molding machine (IS170 (i5), made by Toshiba Machine Co., Ltd.) attached with a valve gate type test mold for in-mold molding, and a PC/ABS resin (LUPOY PC/ABS HI5002, made by LG Chem Ltd.) was subjected to injection molding to obtain a molded product on which a transfer layer was transferred.

(Injection conditions: screw diameter 40 mm, cylinder temperature 250° C., mold temperature 60° C. (fixed side and movable side), injection pressure 160 MPa (80%), dwell pressure 100 MPa, injection speed 60 mm/sec (28%), injection time 4 seconds, cooling time 20 seconds)

An appearance of a gate portion and a deep-drawn corner portion of the transfer molded product obtained as described above was visually confirmed.

Gate portion evaluation criteria: good: no flow of resin and ink; poor: observed, resin and ink flow.

Deep-drawn corner portion evaluation criteria: good: no crack development; poor: observed, crack development.

(2) UV Irradiation

The resulting transfer layer of the transfer molded product as described above was irradiated, on the transfer layer surface side, with ultraviolet light at an irradiance of 200 mW/cm$^2$ and an exposure amount of 1,000 mJ/cm$^2$ by using a conveyor type ultraviolet light irradiation device attached with a high-pressure mercury lamp (H08-L41, rating: 160 W/cm, made by Iwasaki Electric Co., Ltd.) to obtain an ultraviolet light-cured film. The exposure amount was measured by an illuminometer (UVPF-A1 (PD-365), made by Iwasaki Electric Co., Ltd.).

(3) Pencil Hardness Measurement

Measurement was carried out on the transfer layer side of the transfer molded product after UV irradiation as described above by using a surface property tester HEIDON Type: 14 W (made by Shinto Scientific Co., Ltd.) in accordance with JIS K5600.

(4) Adhesion Test

The transfer molded product after UV irradiation as described above was immersed into hot water at 70° C. for 30 minutes, and dried, and then on the transfer layer side, 11 cut-lines were produced lengthwise and crosswise at an interval of 1 millimeter, respectively, to prepare 100 pieces of cross-cuts, and then a commercially available cellophane tape CELLOTAPE (registered trademark) CT-24, tape width: 24 mm, made by Nichiban Co., Ltd.) was well adhered thereon. Then, the number of cross-cuts on which the film remained without being peeled upon rapidly peeling the tape at 90 degrees in a forward direction was described. In addition, the method is in accordance with JIS K5400.

(5) Surface Resistance Value

A non-contact surface resistance measuring instrument "717B," made by Delcom Instruments, Inc. was used to measure a resistance value near a gate portion on the surface side of the topcoat layer of the transfer molded product after UV irradiation as described above.

TABLE 3

| | Film structure | Example 3 F6-1 | Comparative Example 3 F6-2 | Comparative Example 4 F6-3 |
|---|---|---|---|---|
| In-mold injection molding test | Appearance at gate portion | Good | Good | Poor |
| | Deep-drawn corner portion | Good | Good | Poor |
| After UV irradiation | Pencil hardness | 2H | 2H | H |
| | Adhesion test | 100/100 | 100/100 | 85/100 |
| | Resistance value (Ω/□) | 100 | >10$^4$ | >10$^4$ |

The film (Example 3) in which the conductor layer using the electrically conducting material that follows the elongation of the topcoat layer is contained is found to have excellent moldability without adversely affecting the gate flow and followability of the film (membrane) in a three-dimensional structure portion during injection molding. Moreover, after UV irradiation, high hardness is found to be achieved, surface characteristics such as adhesion between the layers for each are also found to be maintained, and electrical conductivity (resistance value) is found to be retained.

An in-mold film having electrical conductivity in which transparency is maintained can be prepared by using transparent ink (VIC(N)/VIC curing agent, made by Seiko Advance Ltd.) in place of coating liquid C5-1 containing black ink in formation of printing layer L5 in Example 3. Moreover, also when no printing layer L5 is formed and adhesive layer L6 is directly formed on conductor layer L4 in Example 3, the in-mold film having electrical conductivity in which transparency is maintained can be prepared.

Further, a molded product in which a transfer film for in-mold molding, the film having electrical conductivity, is transferred and transparency is maintained can be prepared by using a PMMA resin (ALTUGLAS, made by ARKEMA) or a cycloolefin resin (TOPAS, made by Polyplastics Co., Ltd.) in place of the PC/ABS resin in the injection molding test of the in-mold film having electrical conductivity in which transparency is maintained.

Formation of Transfer Film for in-Mold Molding 3

Synthesis of Polymer A-1

A compound (polymer A-1) that develops a surface modification function was synthesized.

Into a nitrogen-sealed four-neck flask (300 mL) attached with a reflux condenser, a thermometer, a stirring blade and a septum, chemical substance A (fluorosilsesquioxane compound) (11.25 g), methyl methacrylate (MMA, 33.75 g) and 2-butanone (MEK, 104.41 g) were introduced. Then, the resulting mixture was warmed in an oil bath and refluxed for 15 minutes, and then an azobisisobutyronitrile (AIBN)/MEK solution (10% by weight, 5.8683 g) was charged thereinto to start polymerization. A reaction was performed for 5 hours, and then an AIBN/MEK solution (10% by weight, 5.8683 g) was further added thereto and the resulting mixture was aged for 3 hours. A point at which a monomer conversion ratio reached saturation by gas chromatography was taken as a reaction end point to obtain an MEK solution of an objective polymer A-1. A monomer composition, a fluorine concentration (F concentration), weight averaged molecular weight (Mw) and a polydispersion index (Mw/Mn) of polymer A-1 obtained are shown in Table 4. The weight averaged molecular weight and the polydispersion index were measured by using gel permeation chromatography (GPC, model No.: Alliance 2695, made by Waters Corporation, column: Shodex GPC KF-804L×2 (in series), Guard column: KF-G).

Chemical substance A has molecular structure shown in formula (I) below.

Formula 2

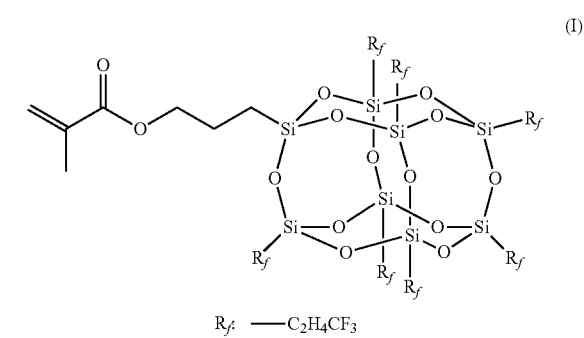

$R_f$: —C$_2$H$_4$CF$_3$

TABLE 4

| | Copolymer component (% by weight) | | F Concentration | Mw |
|---|---|---|---|---|
| Polymer | Chemical substance A | MMA | (%) | (Mw/Mn) |
| A-1 | 25 | 75 | 8.2 | 21,000 (1.7) |

Example 4

Figure 6:
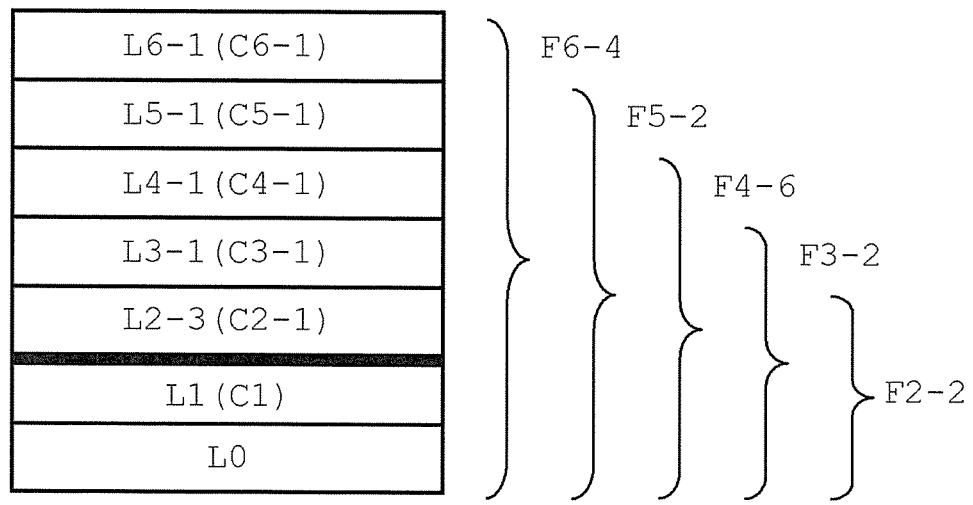
FIG. 6 is a diagram showing layer structure in Examples 4 and 5.
Figure 6:
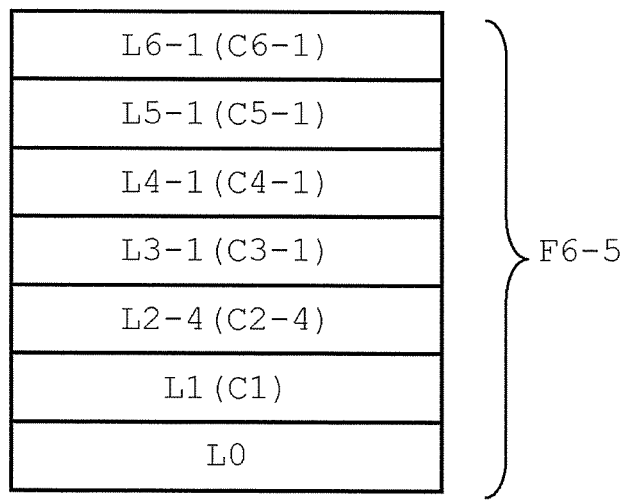

Layer structure is shown in FIG. 6.
Formation of Release Layer

Film F1 having release layer L1 was obtained in a manner similar to the method in Example 1.
Formation of Topcoat Layer Having Surface Modification Layer First, an MEK solution of polymer A-1 was applied onto a surface of release layer L1 of film F1 by using a coating rod (#6) by R. D. Specialties, Inc.

The resulting coated film was dried in a high-temperature chamber at 80° C. for 60 seconds to obtain a surface modification layer having a film thickness of 2 micrometers.

Next, coating liquid C2-1 (resin component concentration: 30% by weight) was prepared in which coating liquid C2-1 was composed of 56.0% by weight of UV reactive acrylic resin (UVT Clear (trade name) NSF-001, containing about 37% by weight of resin component in the product, made by DIC Corporation) containing a photoinitiator as an active energy ray-curable resin, 9.0% by weight of alicyclic polyfunctional epoxy resin (CELLOXIDE 3150 (trade name), epoxy equivalent: 180 g/mol, made by Daicel Corporation) as a thermosetting resin, 34.5% by weight of 2-butanone (MEK) as a diluent solvent and 0.5% by weight of cationic polymerization initiator (SAN-AID (trade name), SI-60, made by Sanshin Chemical Industry Co., Ltd.) as a curing agent.

The resulting coating liquid C2-1 was applied onto a surface modification layer by using a coating rod (#16) made by R. D. Specialties, Inc.

The resulting coated film was dried in a high-temperature chamber at 140° C. for 60 seconds to obtain film F2-2 having topcoat layer L2-3 having the surface modification layer, topcoat layer L2-3 having a layer thickness of 6 micrometers (2 micrometers for the surface modification layer).
Formation of Anchor Layer Coating liquid C3-1 was prepared in a manner similar to the method in Example 3.

The resulting coating liquid C3-1 was applied onto a surface of topcoat layer L2-3 of film F2-2 by using a coating rod (#9) made by R. D. Specialties, Inc.

The resulting coated film was dried in a high-temperature chamber at 140° C. for 60 seconds to obtain film F3-2 having anchor layer L3-1 having a layer thickness of 2 micrometers.
Formation of Conductor Layer Coating liquid C4-1 (ClearOhm (trade name), made by Cambrios Technologies Corporation) containing silver nanowires was applied onto a surface of anchor layer of film F3-2 in a manner similar to the method in Example 3 to obtain film F4-6 having conductor layer L4-1 having a film thickness of 50 nanometers.
Formation of Printing Layer Coating liquid C5-1 (VIC(Z)710 black/VIC curing agent, made by Seiko Advance Ltd.) containing ink was applied onto a surface of conductor layer of film F4-6 in a manner similar to the method in Example 3 to obtain film F5-2 having printing layer L5-1 having a film thickness of 4 micrometers.
Formation of Adhesive Layer Coating liquid C6-1 (JT-27 Base Clear, made by Seiko Advance Ltd.) containing an adhesive was applied onto a surface of printing layer L5-1 of film F5-2 in a manner similar to the method in Example 3 to obtain film F6-4 having adhesive layer L6-1 having a film thickness of 2 micrometers.

More specifically, film F6-4 has film structure laminated in the order of base film L0 (PET), release layer L1, topcoat layer L2-3, anchor layer L3-1, conductor layer L4-1, printing layer L5-1 and adhesive layer L6-1. In addition, topcoat layer L2-3 is a layer having the surface modification layer.

Example 5

Layer structure is shown in FIG. 6.
Formation of Film Having Topcoat Layer Containing Surface Modification Component Film F6-5 was obtained by performing operation in a manner similar to the operation in Example 4 except that no surface modification layer was formed, and in formation of the topcoat layer, coating liquid C2-4 was used in which 1% of MEK solution of polymer A-1 serving as surface modification component C2-1 was added thereto based on the resin component concentration of C2-1 to obtain topcoat layer L2-4.

More specifically, film F6-5 has film structure laminated in the order of base film L0 (PET), release layer L1, topcoat layer L2-4, anchor layer L3-1, conductor layer L4-1, printing layer L5-1 and adhesive layer L6-1. In addition, topcoat layer L2-4 is a layer containing the surface modification component.
Tests 4

An injection molding test described below was conducted on the films (F6-1, F6-4, F6-5) obtained in Examples 3 to 5.
(1) Injection Molding Test The film on which printing layer L5 and adhesive layer L6 were coated as described above was set to an injection molding machine (IS170 (i5), made by Toshiba Machine Co., Ltd.) attached with a valve gate type test mold for in-mold molding and a PC/ABS resin (LUPOY PC/ABS HI5002, made by LG Chem Ltd.) was subjected to injection molding to obtain a molded product on which a transfer layer was transferred.

(Injection conditions: screw diameter 40 mm, cylinder temperature 250° C., mold temperature 60° C. (fixed side and movable side), injection pressure 160 MPa (80%), dwell pressure 100 MPa, injection speed 60 mm/second (28%), injection time 4 seconds, cooling time 20 seconds)

An appearance of a gate portion and a deep-drawn corner portion of the transfer molded product obtained as described above was visually confirmed.

Gate portion evaluation criteria: good: no flow of resin and printing ink; poor: observed, flow of resin and ink.

Deep-drawn corner portion evaluation criteria: good: no crack development; poor: observed, crack development.
(2) UV Irradiation The resulting transfer layer of the transfer molded product obtained as described above was irradiated, on the transfer layer surface side, with ultraviolet light at an irradiance of 200 mW/cm$^2$ and an exposure amount of 1,000 mJ/cm$^2$ by using a conveyor type ultraviolet light irradiation device attached with a high-pressure mercury lamp (H08-L41, rating 160 W/cm, made by Iwasaki Electric Co., Ltd.) to obtain an ultraviolet light-cured film. The exposure amount was measured by an illuminometer (UVPF-A1 (PD-365), made by Iwasaki Electric Co., Ltd.).
(3) Surface Free Energy A contact angle on the side of the transfer layer of the transfer molded product after UV irradiation as described above was measured by using a contact angle meter "DM500" made by Kyowa Interface Science Co., Ltd. As a probe liquid, two kinds of liquids, namely distilled water (for measuring nitrogen and phosphor, made by Kanto Chemical Co., Inc.) and tricresyl phosphate (99%, made by Tokyo Chemical Industry Co., Ltd.) were used to calculate surface free energy from measured values, according to the theory of Kaelble-Uy.

(4) Pencil Hardness Measurement

Measurement was carried out on the transfer layer side of the transfer molded product after UV irradiation as described above by using a surface property tester HEIDON Type: 14 W (made by Shinto Scientific Co., Ltd.) in accordance with JIS K5600.

(5) Adhesion Test

The transfer molded product after UV irradiation as described above was immersed into hot water at 70° C. for 30 minutes, and dried, and then on the transfer layer side, 11 cut-lines were produced lengthwise and crosswise at an interval of 1 millimeter, respectively, to prepare 100 pieces of cross-cuts, and then a commercially available cellophane tape CELLOTAPE (registered trademark) CT-24, tape width: 24 mm, made by Nichiban Co., Ltd.) was well adhered thereon. Then, the number of cross-cuts on which the film remained without being peeled upon rapidly peeling the tape at 90 degrees in a forward direction was described. In addition, the method is in accordance with JIS K5400.

(6) Surface Resistance Value

A non-contact surface resistance measuring instrument "717B," made by Delcom Instruments, Inc. was used to measure a resistance value near a gate portion on the surface side of the topcoat layer of the transfer molded product after UV irradiation as described above.

TABLE 5

| | Film structure | Example 3 F6-1 | Example 4 F6-4 | Example 5 F6-5 |
|---|---|---|---|---|
| Film structure | Adhesive layer | L6-1 | L6-1 | L6-1 |
| | Printing layer (ink layer) | L5-1 | L5-1 | L5-1 |
| | Conductor layer | L4-1 | L4-1 | L4-1 |
| | Anchor layer | L3-1 | L3-1 | L3-1 |
| | Topcoat layer (surface modification layer) | L2-1 (No) | L2-3 (Yes) | L2-4 (No*) |
| | Release layer | L1 | L1 | L1 |
| | Base | L0(PET) | L0(PET) | L0(PET) |
| In-mold injection molding test | Appearance at gate portion | Good | Good | Good |
| | Deep-drawn corner portion | Good | Good | Good |
| After UV irradiation | Surface free energy (mN/m) | 31 | 26 | 27 |
| | Pencil hardness | 2H | 3H | 3H |
| | Adhesion test | 100/100 | 100/100 | 100/100 |
| | Resistance value ($\Omega/\square$) | 100 | 100 | 100 |

*However, L2 to L4 contain the surface modification component.

The film in which the topcoat layer has the surface modification layer (Example 4) and the film in which the topcoat layer contains the surface modification component (Example 5) are also found, in a manner similar to Example 3 (film having no surface modification layer or no surface modification component), while electrical conductivity (resistance value) is maintained, to have excellent moldability, achieved high hardness after UV irradiation, and also excellent water-repellency and oil-repellency, leading to provision of the antifouling function, by achievement of low surface free energy.

Use of a noun or nouns and similar referents used in the context in the description of the invention (particularly in the context of claims as described below) is to be construed to cover both the singular form and the plural form, unless otherwise indicated herein or clearly contradicted by context. The terms "comprising," "having," "including" and "containing" are to be construed as open-ended terms (more specifically, meaning "including, but not limited to") unless otherwise noted. Recitation of ranges of numerical values herein are merely intended to serve as a shorthand method of referring individually to each separate value falling within the range, unless otherwise indicated herein, and each separate value is incorporated herein as if it were individually recited herein. All methods described herein can be performed in any suitable order unless otherwise indicated herein or otherwise clearly contradicted in the context. The use of any and all examples, or exemplary language ("such as") provided herein, is intended merely to better illuminate the invention and does not pose a limitation on the scope of the invention unless otherwise claimed. No language herein should be construed as indicating any non-claimed element as essential to the practice of the invention.

Preferred embodiments of the invention are described herein, including the best embodiment known to the present inventors for carrying out the invention. Variations of the preferred embodiments may become apparent to those skilled in the art upon reading the foregoing description. The present inventors expect skilled artisans to employ such variations as appropriate, and the present inventors intend for the invention to be practiced otherwise than as specifically described herein. Accordingly, the invention includes all modifications and equivalents of the subject matter recited in the claims appended hereto as permitted by applicable law.

Moreover, any combination of the elements in all possible variations thereof is encompassed by the invention unless otherwise indicated herein or otherwise clearly contradicted by context.

What is claimed is:

1. A transfer film for in-mold molding, comprising:
   a transfer layer to be transferred onto a transfer object in in-mold molding, and being cured by irradiation with an active energy ray after being transferred; and
   a film base, wherein
   the transfer layer has
      a topcoat layer laminated on the film base to be arranged on a surface of a molded product after in-mold molding; and
      a conductor layer laminated on a first side of the topcoat layer opposite to a second side of the topcoat layer facing the film base,
   the transfer layer has an anchor layer that is between the topcoat layer and the conductor layer, and directly laminated on the topcoat layer, and contains a thermosetting resin having been thermally cured to improve adhesion between the topcoat layer and the conductor layer,
   the topcoat layer comprises a mixed composition containing an active energy ray-curable resin and a thermosetting resin,
   the conductor layer is formed of at least one kind selected from the group of a flexible metal, carbon and conductive polymer, and
   the thermosetting resin contained in the anchor layer is identical with the thermosetting resin contained in the mixed composition comprised in the topcoat layer.

2. The transfer film for in-mold molding according to claim 1, wherein the transfer layer includes the thermosetting resin contained in the topcoat layer in which the thermosetting resin is cured by heating before transfer.

3. The transfer film for in-mold molding according to claim 1, wherein the thermosetting resin contains at least one kind of an epoxy resin, a melamine resin and a urethane resin.

4. The transfer film for in-mold molding according to claim 1, wherein the topcoat layer contains a surface modification component or has a surface modification layer at the second side of the topcoat layer facing the film base.

5. The transfer film for in-mold molding according to claim 4, wherein the surface modification component or the surface modification layer contains at least one kind selected from a silicone compound, a fluorine compound and a fluorosilsesquioxane-containing compound.

6. The transfer film for in-mold molding according to claim 1, wherein the transfer layer further has a printing layer laminated on the anchor layer or the conductor layer.

7. The transfer film for in-mold molding according to claim 1, wherein the transfer layer further has an adhesive layer to be adhered on a resin for in-mold molding to be injected in the in mold molding a mold.

8. A method for producing an in-mold molded product, comprising;
  a step of placing and arranging on a mold the transfer film for in-mold molding according to claim 1 such that the side of the film base is arranged on a side of the mold; and
  a step of injecting a resin for in-mold molding onto the transfer film for in-mold molding.

9. A molded product, comprising:
  a transfer layer of the transfer film for in-mold molding according to claim 1; and
  a transfer object onto which the transfer layer is transferred.

* * * * *